(12) United States Patent
Maker et al.

(10) Patent No.: US 10,839,136 B2
(45) Date of Patent: Nov. 17, 2020

(54) GENERATION OF COLLATERAL OBJECT REPRESENTATIONS IN COLLABORATION ENVIRONMENTS

(71) Applicant: Box, Inc., Redwood City, CA (US)

(72) Inventors: Varun Maker, San Francisco, CA (US); Reshma Ananthakrishnan, Menlo Park, CA (US)

(73) Assignee: Box, Inc., Redwood City, CA (US)

( * ) Notice: Subject to any disclaimer, the term of this patent is extended or adjusted under 35 U.S.C. 154(b) by 100 days.

(21) Appl. No.: 15/684,680

(22) Filed: Aug. 23, 2017

(65) Prior Publication Data

US 2018/0067903 A1 Mar. 8, 2018

Related U.S. Application Data

(60) Provisional application No. 62/384,646, filed on Sep. 7, 2016.

(51) Int. Cl.
*G06F 3/048* (2013.01)
*G06F 40/106* (2020.01)
(Continued)

(52) U.S. Cl.
CPC .......... *G06F 40/106* (2020.01); *G06F 40/131* (2020.01); *G06F 40/16* (2020.01); *G06F 40/197* (2020.01); *G06F 40/30* (2020.01); *G06F 3/0484* (2013.01); *H04L 67/10* (2013.01); *H04L 67/22* (2013.01); *H04L 67/306* (2013.01)

(58) Field of Classification Search
None
See application file for complete search history.

(56) References Cited

U.S. PATENT DOCUMENTS

| 2006/0200556 A1* | 9/2006 | Brave | G06F 16/9535 |
| | | | 709/224 |
| 2010/0185955 A1* | 7/2010 | Kato | G06F 3/1423 |
| | | | 715/751 |

(Continued)

OTHER PUBLICATIONS

EMC Documentum Content Transformation Services Transformation Suite Version 7.2 Administration Guide, 2016.

*Primary Examiner* — William C Trapanese
(74) *Attorney, Agent, or Firm* — Vista IP Law Group, LLP

(57) ABSTRACT

Systems for online collaboration. Exemplary embodiments are implemented within cloud-based service platforms. User actions that are performed by a first user over collaboration object are observed. Other users collaborate over the same collaboration object and their actions are observed as well. Rather than responding to an explicit user request for conversions into collateral object representations in particular forms or formats, the system uses a predictor to determine the forms and formats of collateral object representations to generate on behalf of the first user. Based on then-current conditions and any sets of data collected that pertain to the first user and/or the other users, collateral object representations are formed and presented in particular forms or formats that are applicable to the then current conditions. When conditions change, the determined collateral object representations are then re-formed and re-presented in as many different forms or formats as are applicable to the changed conditions.

20 Claims, 13 Drawing Sheets

(51) Int. Cl.
*G06F 40/16* (2020.01)
*G06F 40/30* (2020.01)
*G06F 40/131* (2020.01)
*G06F 40/197* (2020.01)
H04L 29/08 (2006.01)
G06F 3/0484 (2013.01)

(56) References Cited

U.S. PATENT DOCUMENTS

2012/0324373 A1* 12/2012 Halliday ............... G06Q 10/10
715/759
2014/0020080 A1* 1/2014 Antypas, III ....... G06F 21/6218
726/9
2016/0321462 A1* 11/2016 Bhogal .................. G06F 17/24
2018/0026984 A1 1/2018 Maker et al.

* cited by examiner

GENERATION OF COLLATERAL OBJECT REPRESENTATIONS IN COLLABORATION ENVIRONMENTS

RELATED APPLICATIONS

The present application claims the benefit of priority to U.S. Provisional Patent Application Ser. No. 62/384,646 titled "GENERATION OF COLLATERAL OBJECT REPRESENTATIONS IN A WEB-BASED COLLABORATION ENVIRONMENT", filed Sep. 7, 2016, which is hereby incorporated by reference in its entirety.

FIELD

This disclosure relates to online collaboration systems, and more particularly to techniques for generating collateral object representations.

BACKGROUND

Proliferation of cloud-based content management services and rapid adoption of cloud-based collaboration have impacted the way electronically stored information objects (e.g., files, images, videos, etc.) are stored, shared and managed. One benefit of using cloud-based service platforms is the ability to securely create and share large volumes of content among multiple users. For example, a large enterprise (e.g., company, firm, etc.) with thousands of users (e.g., employees, customers, etc.) and many terabytes of content might use a cloud-based service platform to efficiently and securely provide access to content by various individual users and/or collaborating groups of users.

In many cases the particular form or format of some particular content (e.g., a word document) that is provided to the cloud-based content management service might not be initially provided in a form or format that is ideal for the user's consideration, and/or for an intended use at that particular moment in time, and/or might not be in a form or format that is ideal for use in the then-current environment or setting in which the user is situated.

Unfortunately, legacy approaches rely on user commands to invoke actions that reformat and/or re-present collaboration objects in forms or formats that are needed for use in the particular setting (e.g., in a mobile environment or an office environment, etc.) of the particular collaborator. Moreover, legacy approaches fail to consider the totality of circumstances and environments that could influence generation of any particular form or format of one or more of the collaboration objects, and/or whether or not to present a collaboration object, and/or whether or not to present an excerpt or redaction of a collaboration object.

Therefore, what is needed is a technique or techniques to improve over legacy techniques and/or to improve over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by their inclusion in this section.

SUMMARY

The present disclosure describes techniques used in systems, methods, and in computer program products for predicting a user's need for particular renditions or excerpts of objects found in a collaboration environment. More specifically, the present disclosure describes techniques used in systems, methods, and in computer program products for generation of collateral object representations in a collaboration environment. Certain embodiments are directed to technological solutions for systems that infer user intent so as to predict a user's need for collateral object representations.

The disclosed embodiments modify and improve over legacy approaches. In particular, the herein-disclosed techniques provide technical solutions that address the technical problems attendant to generating collateral representations of collaboration objects. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of human-machine interfaces as well as advances in various technical fields related to machine learning systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
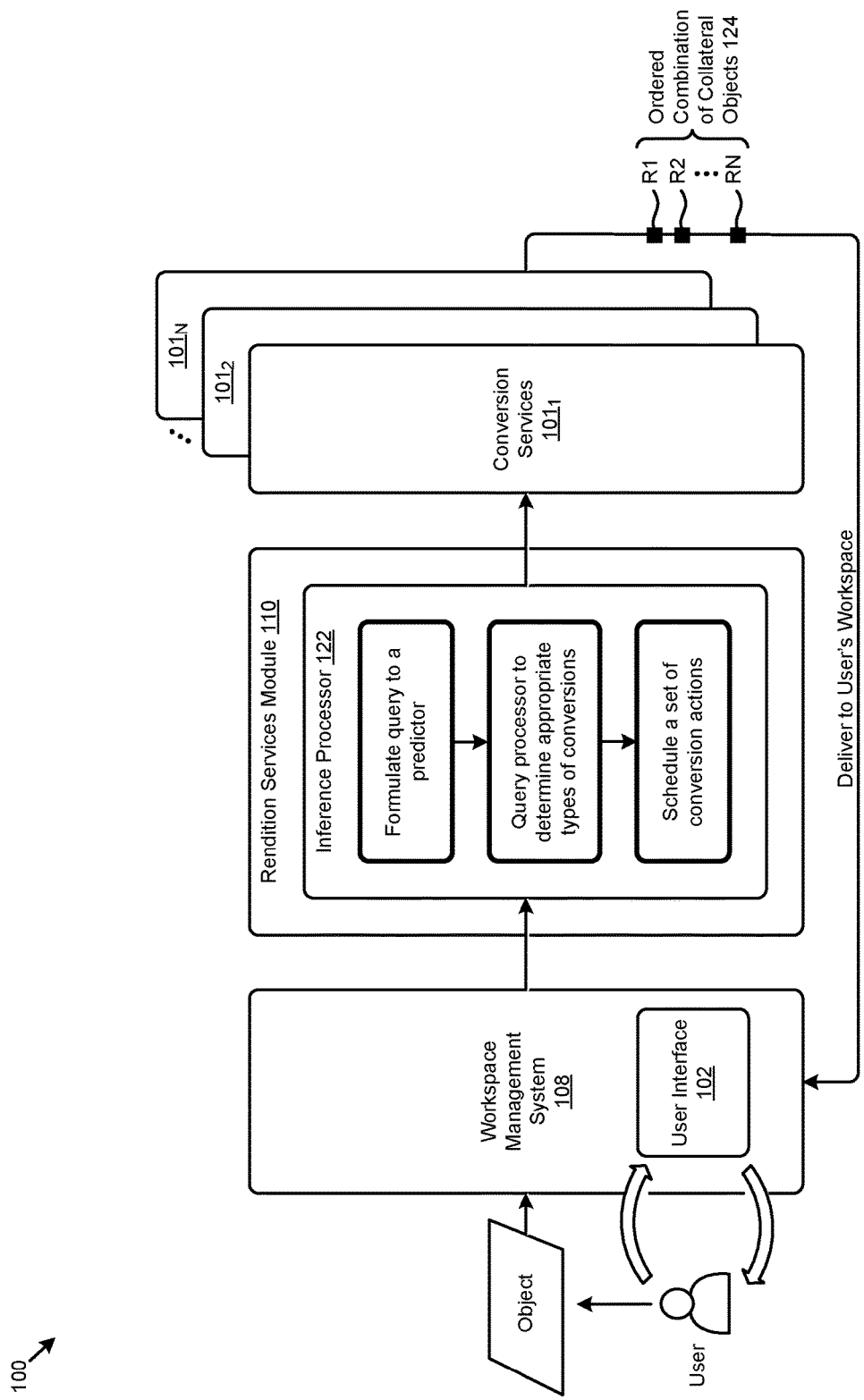
FIG. 1A depicts a collaboration environment comprising an inference processor for determining user demand for collateral object representations, according to an embodiment.

Embodiments in accordance with the present disclosure address the problem of determining a set of actions to be taken on behalf of the user to generate collateral representations. The determined actions might be based on aspects of collaboration objects, and/or aspects of content that is shared by multiple users. The determined actions might be based on user profile data. Some embodiments are directed to prediction systems that consider characteristics of a user's environment and/or history when generating collateral object representations. Some embodiments are directed to automatic scheduling of collateral representation generation actions. The accompanying figures and discussions herein present example environments, systems, methods, and computer program products.

Overview

Collaborators over a particular item of shared content (e.g., document or other sharable content) want to concentrate on the meaning of the content rather than on the form or format of the content. Collaborators do not want to spend time addressing and/or performing the mechanical steps of reformatting content for a particular setting or usage. Indeed, reformatting content for a particular setting or usage sometimes consumes manual human interaction (e.g., resulting in wasted time and lost productivity). In some cases, the mechanical steps of reformatting content have to be performed over and over for each collaboration object. In other cases, collaborators end up spending time in reviewing large amounts of material when only small summaries of the material would be needed by the user to develop insight or meaning.

Many user-directed steps such as those pertaining to summarizing and/or reformatting and/or organizing/re-organizing the material can be replaced by automated processes that predict a collaborator's needs and/or wishes and/or intents, and processes that present only derivative or collateral objects that foster user cognition (e.g., to advance understanding, meaning and insight).

The techniques disclosed herein are techniques that access a particular item of subject content, and then, on the basis of the totality of information available to the collaboration platform, schedule actions to produce various derivative representations (e.g., in various forms or formats). The identification of use patterns can be used to predict a user's intent such that the needed form or formats are automatically generated on behalf of a user. Further, the identification of characteristics of a user's environment can be used to predict a user's need such that the needed form or formats are prospectively generated.

The aforementioned identification of patterns and suggestions of actions to take can be implemented through use of predictive heuristics and/or through use of predictive learning models. Furthermore, services to initiate actions to take on behalf of the user/collaborator can be automated. In some embodiments, after the pertinent information in the form or formats needed by the user have been automatically generated and presented to the user/collaborator, the user/collaborator interacts with the newly-presented information, which in turn generates new events that can be used in subsequent cycles.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A depicts a collaboration environment 100 comprising an inference processor for determining user demand for collateral object representations. As an option, one or more variations of collaboration environment 100 or any aspect thereof may be implemented in the context of the architecture and functionality of the embodiments described herein.

As shown, an object (e.g., a file or other collaboration object) is interfaced with a workspace management system 108. Users interact with one or more user interfaces 102 within the workspace management system to author, share, and otherwise collaborate over collaboration objects with other users. When a user has a need for an alternative representation of the object such as a preview or other rendition, the user can provide the object and conversion instructions (e.g., desired object output type) to a rendition services module 110, which can forward the object and conversion instructions to one or more instances of conversion services (e.g., conversion services $101_1$, conversion services $101_2$, . . . , conversion services $101_N$). The conversion services in turn provide the generated representations to the user, possibly by delivering representations to the user's workspace as an ordered combination of collateral objects 124 (e.g., R1, R2, . . . , RN) such as thumbnails, object previews, text summaries, file excerpts, video excerpts, etc.

In some cases, the needed representations can be determined directly based on the user's interaction with the workspace management system. For example, when a user downloads objects (e.g., files) from a server, the user might want to see the workspace being populated with icons or thumbnails. The workspace management system can determine many aspects of the object by its name (e.g., filename, filename extension, indices into a larger file or database, etc.) based on metadata that corresponds to the object, and the workspace itself can provide both the request for a particular object as well as conversion instructions (e.g., "Request access to file A of type X" and "Convert it to a preview representation for display in this workspace").

The foregoing is one simple case, however in situations where there are many objects, and/or many possible representations, and/or many uses for generated representations, the volume of requests for desired representation conversions can become commensurately larger and larger; therefore, predictive techniques are needed to relieve the user from having to explicitly request each particular desired conversion. Predictive techniques are shown and described herein can infer a user's need for a particular desired conversion as well as a user's need for collateral object representations. Systems using such predictive techniques can automatically generate collateral object representations and can prepare such collateral object representations for transmission to the user's workspace.

The specific embodiment of FIG. 1A depicts a collaboration environment 100 comprising an inference processor 122 that is used for inferring user need for collateral object representations. As an option, one or more variations of the inference processor or any aspect thereof may be implemented in the context of the architecture and functionality of the embodiments described herein.

Figure 6:
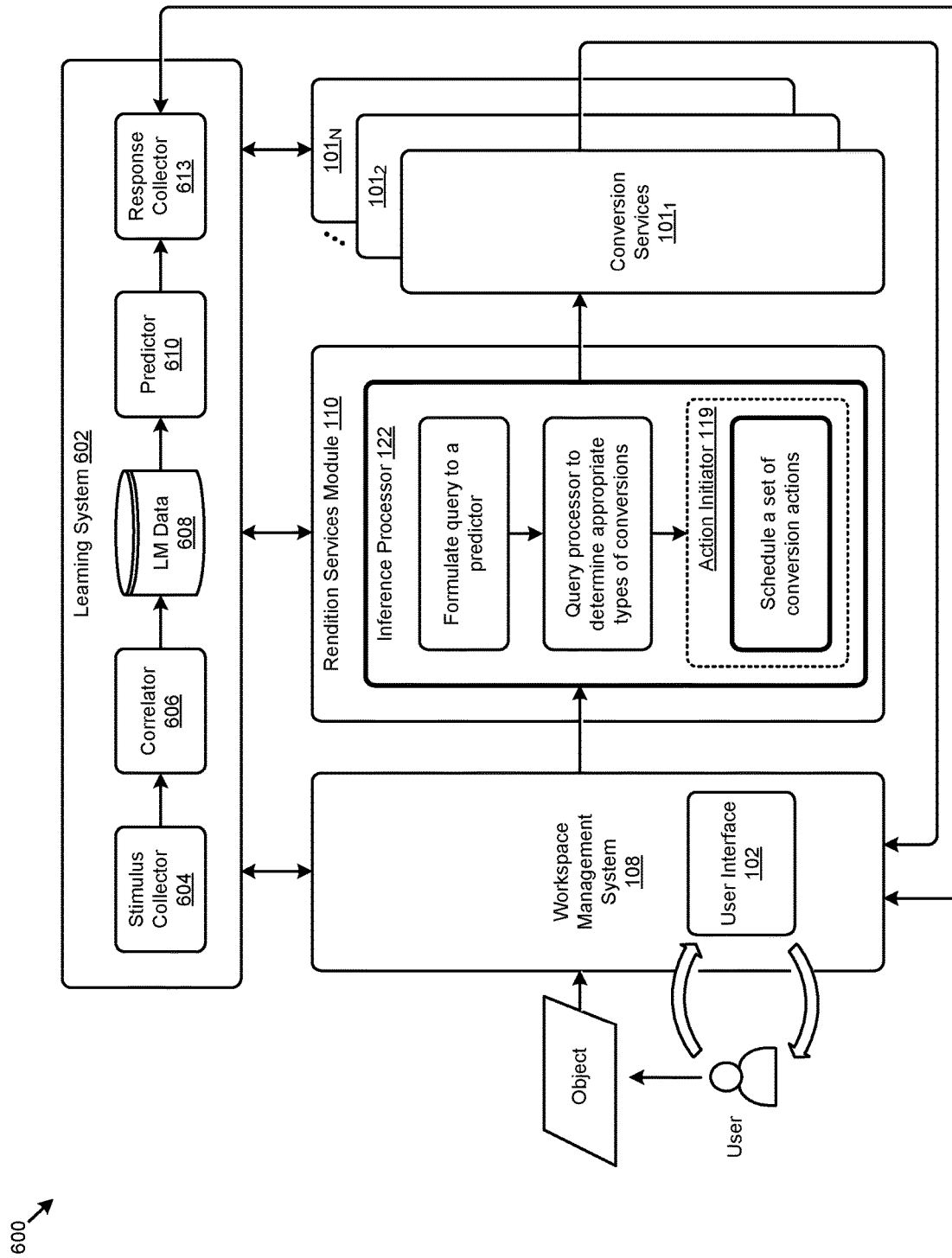
FIG. 6 depicts a web-based collaboration environment that comprises a learning system that is used for forming collateral object representations, according to an embodiment.

The embodiment shown in FIG. 1A is merely one example. As shown, the inference processor 122 is a component of the shown rendition services module 110. The inference processor is configured to interact with predictors (e.g., the predictor of the learning system as shown in FIG. 6) through a query made to a particular predictor.

As such, and based on the collaboration object and/or any explicitly described characteristics of the collaboration object, and/or any known characteristics of the user's environment or use patterns, the inference processor 122 formulates a query to a predictor. The formulated query is passed by the inference processor to a predictor, which in turn can use predictions in combination with rules to generate a set of actions that serve to satisfy users' inferred or predicted needs for generated representations (e.g., the shown ordered combinations of collateral objects 124). The set of actions can be scheduled by the inference processor or any other module so as to provide the generated representations back to the user and/or the user's workspace, and/or to or through any services or applications being run by the user.

In some cases, and as shown, the ordered combination of collateral objects 124 corresponding to output results from performance of the set of scheduled actions can be enumerated into constituents (e.g., representation R1, representation R2, . . . , representation RN) then packaged for transmission to the user's workspace. Upon delivery to the user's workspace, workspace logic can use the constituent representations singly or in combination. In some cases, workspace logic can forward the generated representations to any set of services or applications being run by the user. Over time, actions taken by a collaborator pertaining to a particular collaboration object or object type can be collected. Further, actions taken by a collaborator pertaining to a particular generated object representation (e.g., representation R1, representation R2, . . . , representation RN) can also be collected.

It is often the case in a collaboration system that predictions and/or conversion determinations can be made on the basis of actions taken by a particular user's collaborators. In some cases, predictions and/or conversion determinations can be made with respect to observed events pertaining to the actions. As such, some embodiments implement workspace management systems that observe and forward events. Systems with multiple users (e.g., multiple collaborators) process multiple event streams during the course of collaboration.

Figure 1B:
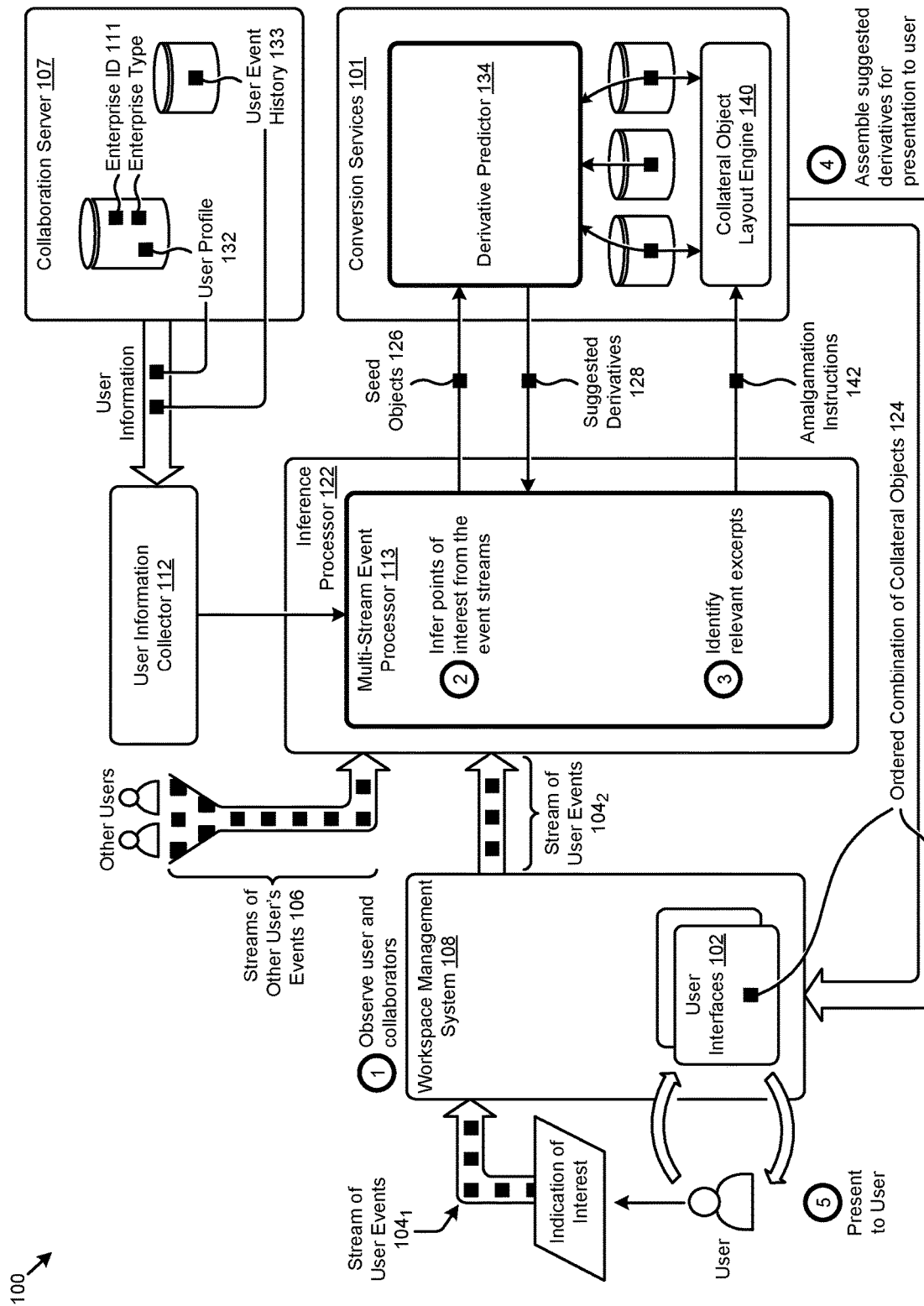
FIG. 1B depicts a collaboration environment comprising multiple event streams used for scoring collaborator influence when predicting a set of collateral object representations, according to an embodiment.

FIG. 1B depicts a collaboration environment 100 comprising multiple event streams used for scoring collaborator influence when predicting a set of collateral object representations. As an option, one or more variations of collaboration environment 100 or any aspect thereof may be implemented in the context of the architecture and functionality of the embodiments described herein.

In this embodiment, the workspace management system 108 is configured to capture a stream of user events $104_1$, some of which are, or can be, determined to be indications of the user's interest (e.g., clicking on a file icon or taking some other action that can be deemed to be an indication of interest). In exemplary systems, there are many users, each such user interacting with his or her workspace. The workspaces and/or their corresponding workspace agents can observe (operation 1) and forward a stream of user events $104_2$ to an inference processor 122. The multi-stream event processor in turn is configured to access a collaboration server 107 to collect information (e.g., from a user profile 132 and/or from a user event history 133) about a particular user. In some cases, and as shown, a user profile 132 might comprise an enterprise ID 111 and/or an enterprise type, etc. The enterprise identification and/or the enterprise type or other characteristics therefrom can be used in selecting in events or filtering out events.

The collaboration server 107 can transmit user information to a collector (e.g., user information collector 112), which information is combined at a multi-stream event processor 113. In this embodiment, the inference processor 122 serves to infer points of interest of the user (operation 2) based on the forwarded stream of user events $104_2$ in combination with streams of other user's events 106.

The inferred points of interest of the user might be inferred directly from the aforementioned user's indication of interest, or it might be taken from a user's indication of interest in combination with other users' indications of interest as can be recognized from the occurrence and nature of events in the stream of other user's events 106. In some cases, a user might operate applications that are supported by the workspace management system, and a user's indication of interest might be based on the occurrence and nature of events in the stream of application-specific events.

Directly or indirectly, the inference processor can form one or more determinations of inferred user interest, which can be codified into one or more seed objects 126 that are transmitted to one or more modules of conversion services 101. In this embodiment, one of the modules of conversion services 101 is a derivative predictor 134, which is configured to receive one or more seed objects, analyze the seed object(s), and then identify relevant excerpts (operation 3) in the form of a set of suggested derivatives that reflect predictions of what the user needs, given his or her indication(s) of interest with respect to his or her then-current environment. The suggested derivatives might also reflect predictions of (possibly) needed derivatives that are predicted based on a given indication of interest in combination with characteristics of other users' interests as determined by analysis of the other users' events.

The multi-stream event processor 113 receives the suggested derivatives 128, considers the suggested derivatives in the context of any other inferences made by the inference processor 122 and emits a set of amalgamation instructions 142, which amalgamation instructions are received by a collateral object layout engine 140. The layout engine can assemble any object or portion of an object and/or any one or more of a set of filtered and/or preprocessed suggested derivatives into an ordered combination of collateral objects 124 (operation 4), which in turn are received by the workspace management system 108 for presentation to the subject user (operation 5).

The embodiment of FIG. 1B supports multiple rendition capabilities. In a first scenario, the embodiment of FIG. 1B is used to generate a user-specific, custom-built representation of a particular file based on (1) the user's profile; (2) the user's own user history of events (e.g., how recently did the user access the particular file) or other observed usage behaviors by the user (e.g., how much time was spent on which portions of the file, which portions of the file were highlighted, etc.); and (3) observed usage behaviors of other users over the same particular file (e.g., how much time was spent on which portions of the file, which portions of the file were highlighted, etc.). Generated user-specific, custom-built collateral objects are presented in a format that is applicable for the user's then-current environment (e.g., based on preferences and/or based on environmental characteristics pertaining to the device on which the user-specific, custom-built representation is rendered).

Such a capability fosters several use models. Strictly as one illustrative example:

1. A user types in search terms that pertain to ideas related to new products that the user's company should build;
2. The inference processor 122 makes predictions of a set of possible areas of specialization or interest of the user based on prior usage of the search terms by the user based on use by the user's team members or other collaborators;
3. A weighted set of candidate collaboration objects is formed based on prior usage of the search terms and/or historical access to the collaboration objects;
4. At least some of the candidate collaboration objects are retrieved and processed so as to extract and rank the content or excerpts therefrom that are predicted to be most valuable to the user; and
5. The resulting ranked content and/or excerpts are presented to the requesting user in the form of one or more collateral objects that are displayed on the user's device.

In some cases, a user's user profile 132 contains sufficient information and privileges to permit integration with the user's operating environment (e.g., calendar program). In some such cases, the inference processor can infer that if the user has a "strategy meeting" scheduled that pertains to one or more of the candidate collaboration objects, then the inference processor can increase the likelihood that the user is asking for this document use in a presentation setting (e.g., in the "strategy meeting") in which case ranked content and/or excerpts that correspond to visual content would be ranked higher than text-only content.

Determination of weights (e.g., for weighting constituents of a set of candidate collaboration objects) or likelihoods (e.g., the likelihood that the user is asking for a particular document for use in a presentation setting) is facilitated by observations taken over time. In example systems, a stimulus collector of a learning system can observe user actions taken on a collaboration object. Events that are processed by such a stimulus collector can be at a very fine level of granularity; for example, down to the granularity of the amount of time a user is displaying a particular passage of a document. Such fine-grained events are further considered by a response collector of the learning system. Based on a set of stimulus observations (e.g., a user request for accessing a document) combined with a set of response observations (e.g., user edits to particular portions of that same document), the learning system can be used as an interest predictor. Over time, the learning system can learn and correlate stimulus patterns to response patterns pertaining to any single user and/or any groups of users (e.g., groups of users belonging to a collaboration group). As such, the correlations can be used by a predictors and/or inference processors.

Strictly as an example, a user might repeatedly request conversion services to convert ".ppt" files into corresponding HTML representations. The user might further store those generated representations to a folder or other repository. Any of the foregoing stimuli (e.g., request conversions services to convert ".ppt" files into derivative HTML representations) and responses (e.g., store those generated derivative representations to a folder or other repository) can be observed by the learning system.

The foregoing example highlights the situation where learned stimulus/response behaviors of a user in a collaboration environment can be used for making inferences that drive derivative generation. One possible embodiment of an inference processor 122 and interactions with derivative predictors in a collaboration environment is shown and described as pertains to FIG. 1C.

Figure 1C:
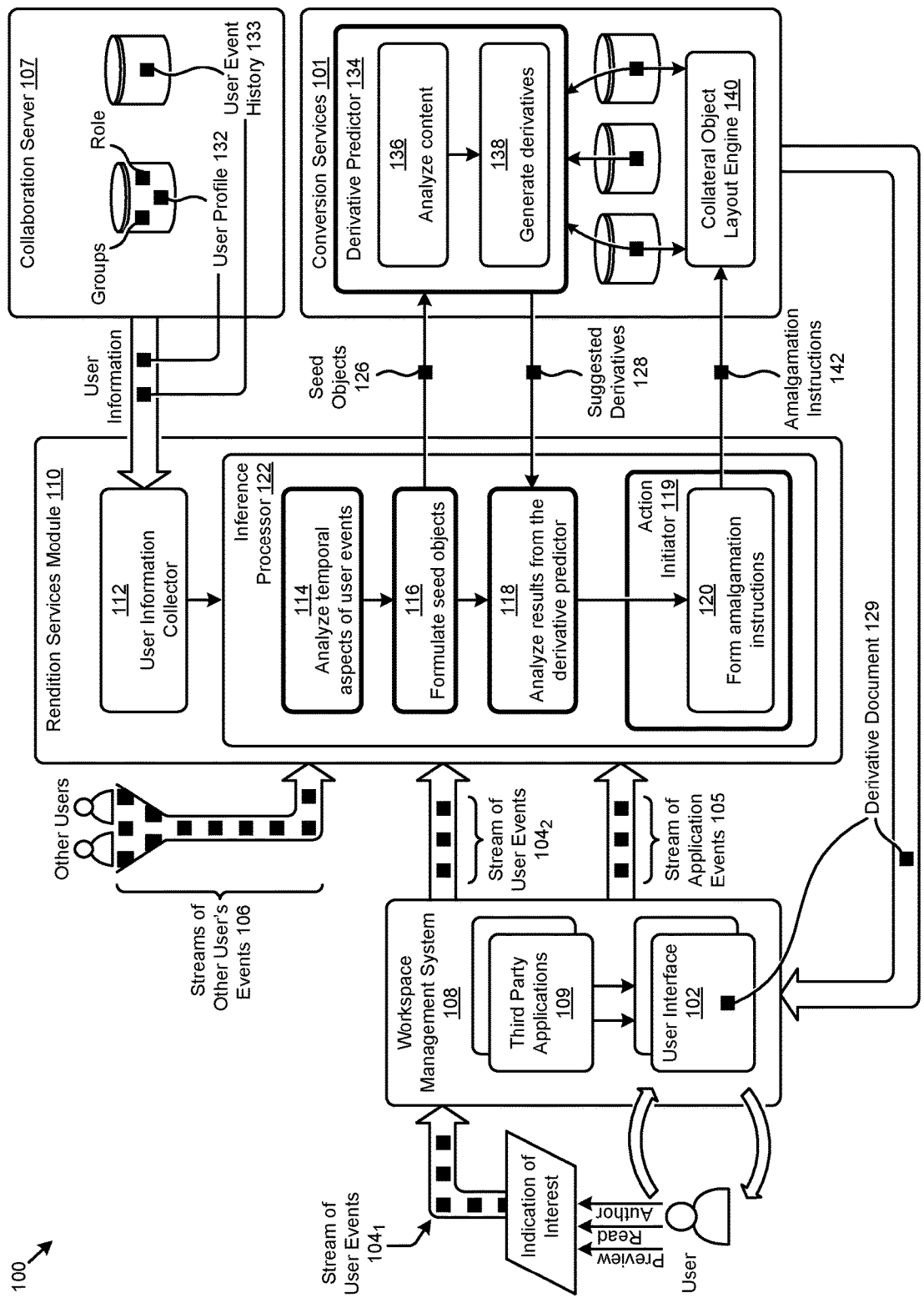
FIG. 1C depicts a collaboration environment in which multiple streams of events are processed, according to an embodiment.

FIG. 1C depicts a collaboration environment 100 in which multiple streams of events are processed. As an option, one or more variations of collaboration environment 100 or any aspect thereof may be implemented in the context of the architecture and functionality of the embodiments described herein.

The shown embodiment includes details of operations of inference processor 122 and its interactions with derivative predictor 134. Specifically, the shown inference processor includes the capability to analyze temporal aspects of incoming user events (step 114), which analysis includes determining temporal aspects such a recency of access to an object, time that a user spent with the object, time that a user spent in an authoring or editing session on the object, and so on. The results of the analysis are used to formulate instances of seed objects 126 (step 116). Seed objects comprise information about one or more candidate collaboration objects as well as information about user behavior over the corresponding candidate collaboration object. Seed objects are transmitted to a derivative predictor 134, which in turn analyzes the content of the candidate collaboration object referenced in the seed object (step 136) and generates derivatives (step 138) based on the analysis. The derivatives that are generated might include derivatives that are excerpts from the candidate collaboration object referenced in the seed object, or the derivatives that are generated might include objects where the format has been modified (e.g., converted from a ".ppt" file into derivative HTML representations).

In some embodiments, the processing to generate derivatives might generate derivatives liberally and produce a set of suggested derivatives 128 to the caller. Strictly as one example, a set of suggested derivatives 128 returned to the caller might comprise all slides of a ".ppt" document over which at least two users spent at least 5 minutes in review. In the embodiment of FIG. 1C, the inference processor includes a step to analyze results from the derivative predictor (step 118). During that analysis, it might be that only some of the constituents of the set of suggested derivatives 128 are deemed to be of interest to the user. Accordingly, it might be that only a subset of the set of suggested derivatives 128 are considered for processing into a collateral object. As shown, outputs of step 118 are received as inputs to step 120. Step 120 in turn serves to form amalgamation instructions (e.g., instruction to use a particular constituents from the set of suggested derivatives, and where to place it in the collateral object that is produced by the collateral object layout engine).

All or some of the foregoing steps and techniques can be used to produce a derivative document such as a collection of excerpts that pertains to an explicit or inferred interest of a user. Strictly as one example, a derivative document generation use case might include the following steps:

1. A user accesses a document and/or types in search terms that pertain to a news event;
2. The inference processor 122 considers both the user's observed actions and actions taken by the user's collaborators to make predictions of a set of corpora that probabilistically contain objects pertaining to the news event;
3. The corpora are indexed against the search terms that pertain to the news event and a weighted set of candidate collaboration objects is formed; then
4. At least some of the candidate collaboration objects are retrieved and processed so as to extract and rank the content or excerpts therefrom that are predicted to be most pertinent to the news event; and
5. The resulting ranked content and/or excerpts are presented to the requesting user in the form of the shown derivative document 129.

The ranked content that comprises the foregoing derivative document might be laid out in a user interface that comprises "content cards". The selection and ordering of the content cards are based at least in part on excerpts from documents that appear in the suggested corpora. The conversion services 101 are configured to be able to create content cards that are customized for any particular user. The conversion services 101 might operate in conjunction with an instance of an inference processor to predict what content, and what form or forms of the content, would most interest the user. As one example of such conversion services 101, the conversion services might operate in conjunction with an instance of an inference processor, where the seed objects that are transmitted from the inference processor to a derivative predictor of the conversion services might include a list of pages in a document that other users (e.g., collaborators or similar users) had spent the most time on in review, or a list of pages that had been highlighted, or a list of pages that include topics that the user might be interested in based on past search results, or a list of pages that had been annotated and/or marked as "favorite", etc. In certain settings, the presented derivatives are logical constructions corresponding to a visual depiction of an index card. In other settings, the presented derivatives are audio clips, such as audio clips that can be played back. In still other settings, the presented derivatives are text excerpts that can be uttered by an automatic speech synthesis facility. In still other settings, the presented derivatives are logical constructions corresponding to a single image or video clip corresponding to a photo or movie.

Any of the foregoing scenarios and/or use models as well as other scenarios and/or use models that are disclosed infra can be carried out by performance of a series of processing steps. A representative processing flow and correlation to aspects of the foregoing systems are shown and described in the following FIG. 2.

Figure 2:
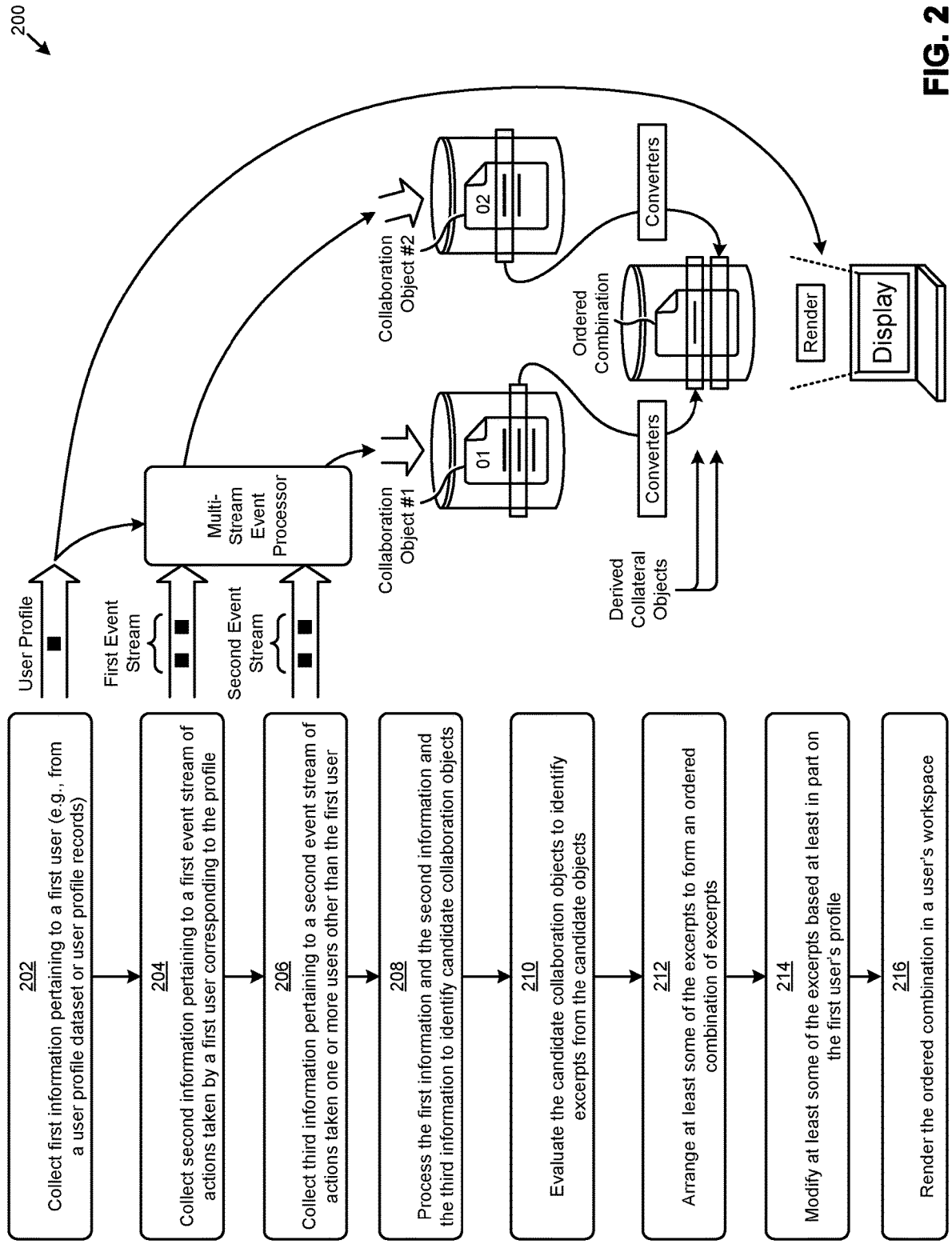
FIG. 2 is a flowchart depicting a processing flow for producing and presenting derived collateral objects, according to an embodiment.

FIG. 2 is a flowchart depicting a processing flow 200 for producing and presenting derived collateral objects. As an option, one or more variations of processing flow 200 or any aspect thereof may be implemented in the context of the architecture and functionality of the embodiments described herein. The processing flow 200 or any aspect thereof may be implemented in any environment. The embodiment shown in FIG. 2 is merely one example.

The shown flow supports many use cases and scenarios. Consider use cases where a first user is interacting with a first collaboration object (e.g., a particular movie trailer) and other users are commenting on the first collaboration object in a second collaboration object (e.g., a review of the particular movie trailer). Consider further that the foregoing first user and the other users are related by, for example, the circumstance of being employed in the same department of the same enterprise. Interactions that the first user takes over the first collaboration object (e.g., viewing and reviewing certain portions of the movie trailer, etc.) and interactions that the other users take over the second collaboration object (e.g., authoring comments that form a review of the movie trailer, etc.) are captured in respective event streams.

For formulating a summary document, a multi-stream event processor of the system might be able to identify the first collaboration object due to the first user's interactions (e.g., viewing and reviewing certain portions of the movie trailer, etc.), and the multi-stream event processor of the system might further be able to identify the second collaboration object due to the other user's interactions (e.g., authoring comments that form a review of the particular movie trailer, etc.).

Using the multi-stream event processor and/or other facilities of the disclosed systems, relationships and/or specific correlations between the first collaboration object and the second collaboration object are formed. For example, the review of the movie trailer might include references to specific portions of the movie trailer itself. Portions of each of the first collaboration object and the second collaboration object can be correlated and excerpted. The excerpts can then be arranged into a particular order and composited or otherwise laid out (e.g., in a third collaboration document) for consideration by the first user. The specifics of how the composited or otherwise laid out third collaboration document is formed, transmitted and delivered can be based at least in part on information about the first user (e.g., preferences) and/or the first user's environment (e.g., device screen size, mobility, etc.).

The foregoing scenario is merely one example. The processing flow of FIG. 2 can be used to generate user-relevant summary documents that pertain to a wide range of combinations of collaboration documents. Moreover, the generation of such user-relevant summary documents can be performed automatically—even in the absence of any request or specification by the user. As shown, the processing flow commences by collecting first set of information pertaining to a first user's profile (step 202). Contemporaneously, multiple streams of events are collected. For example, and as shown, a first stream comprises second information pertaining to a first event stream of actions taken by a first user corresponding to the profile (step 204), while third information pertains to a second event stream of actions taken one or more users other than the first user (step 206).

A multi-stream event processor is used to process the first information together with the second information and together with the third information so as to identify candidate collaboration objects (step 208), which candidate collaboration objects are evaluated to identify excerpts (step 210). The excerpts are arranged to form an ordered combination of excerpts (step 212). To satisfy needs of the user, (e.g., regarding specifics of how the ordered combination of excerpts and/or other derived collateral objects are composited, transmitted and delivered) the excerpts themselves might be converted, and/or the way in which the excerpts are combined might be modified based at least in part on information from the first user's profile (step 214). The composited ordered combination of excerpts is delivered to the user to be rendered in the user's workspace (step 216).

Some of the foregoing steps involve processing user events so as to correlate between a first user's interactions and other users' interactions. One approach involving generation of seed objects is shown and discussed as pertains to FIG. 3.

Figure 3:
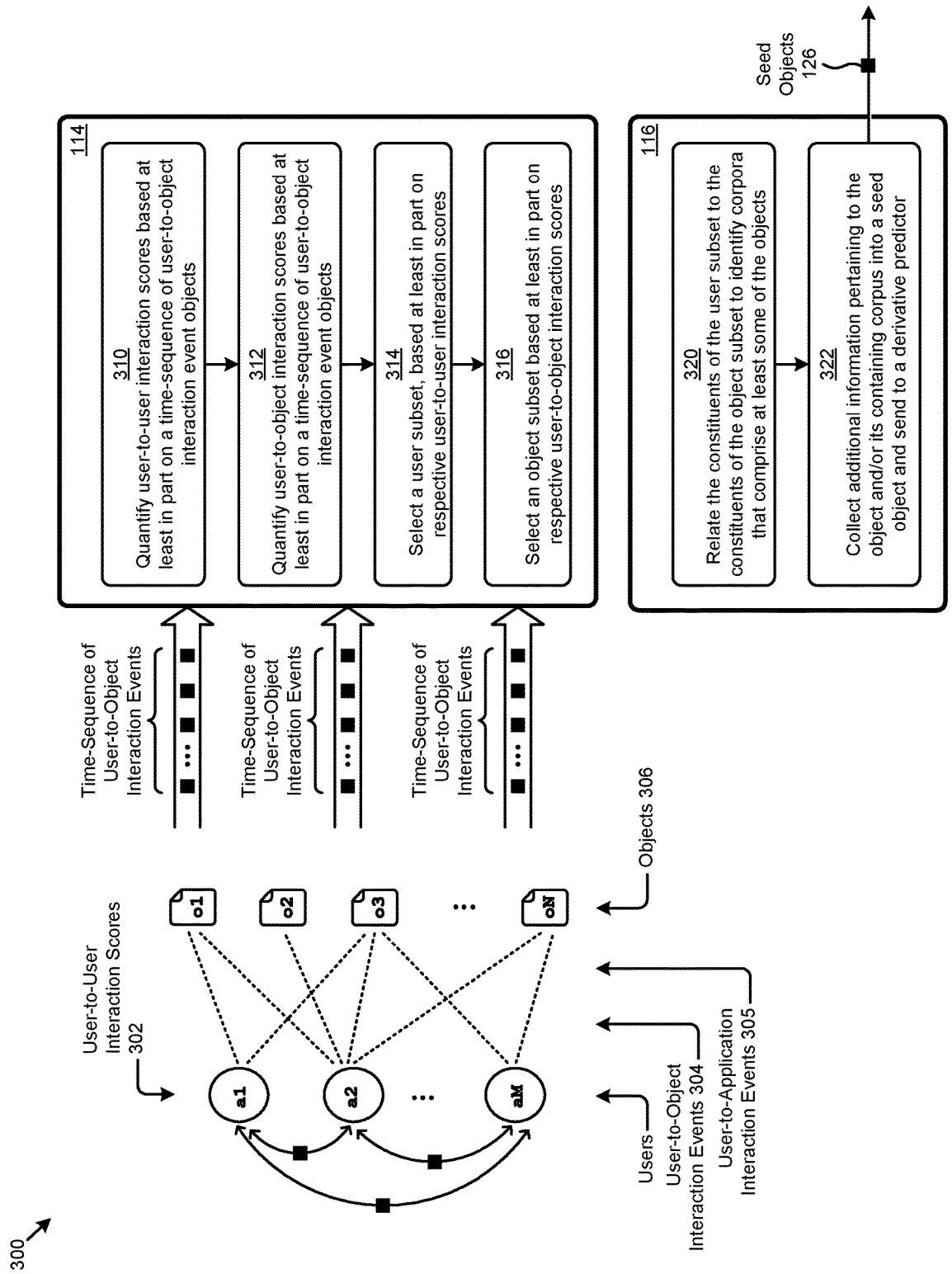
FIG. 3 illustrates a data processing flow in a multiple event stream environment as used to produce seed objects, according to an embodiment.

FIG. 3 illustrates a data processing flow in a multiple event stream environment 300 as used to produce seed objects. As an option, one or more variations of multiple event stream environment 300 or any aspect thereof may be implemented in the context of the architecture and functionality of the embodiments described herein. The multiple event stream environment 300 or any aspect thereof may be implemented in any environment.

The embodiment shown in FIG. 3 is merely one technique for processing user events. As shown, users (e.g., user a1, user a2, . . . , user aM) interact with objects 306 (e.g., object o1, object o2, object o3, . . . , object oN). The interactions are observed, and multiple event streams are formed. The diagram shows formation of three streams, one stream each for the shown users (e.g., user a1, user a2, . . . , user aM). Each stream is a time-sequence of user-to-object interaction events. By observing user-to-object interaction events 304 and correlating events by different users over the same object, user-to-user interaction scores 302 can be calculated. Such user-to-user interaction scores can in turn be used to identify collaborators, and whether or not any two users are in the same enterprise, or same collaboration group, etc. Step 310 serves to quantify user-to-user interaction scores based at least in part on a time-sequence of user-to-object interaction event objects. In some cases, user-to-user interaction scores might be based at least in part on the occurrence and nature of events in the shown user-to-application interaction events 305.

The diagram further depicts additional steps to analyze temporal aspects of incoming user events (at step 114). In particular, the flow serves to quantify user-to-object interaction scores based at least in part on a time-sequence of user-to-object interaction event objects (step 312). When considering the influence of other user's interests when inferring the subject user's interests, the aforementioned user-to-object interaction scores can be used. In some embodiments, scores are numeric values that are indicative of the strength of similarity between one user and another user. Thus, a threshold as to the value of a user-to-user score can be used to select a user subset, based at least in part on respective user-to-user interaction scores (step 314). The same or similar threshold technique can be used when selecting an object subset based at least in part on respective user-to-object interaction scores (step 316). Selecting an object subset might rely on selecting in events or filtering out events. For example, events and/or respective scores might correspond to conditions where a user and/or the act of the interaction is performed outside of a particular geo-location. In some situations, events and/or respective scores might correspond to objects that are deemed or marked as "private". In some situations, events and/or respective scores might correspond to user-to-object scores pertaining to a user or users that are not in the same enterprise as a subject user.

After the user subset and the object subset have been determined, additional processing (at step 116) can be invoked to relate the constituents of the user subset to the constituents of the object subset so as to identify corpora that comprise at least some of the objects (step 320). Any known techniques can then be used to collect additional information pertaining to any particular object or objects and/or respective corpora. Some or all of the additional information can be codified into a respective seed object and any number of seed objects 126 can be transmitted to a derivative predictor (step 322). In some systems, such as in the system of FIG. 1C, third party applications 109 (e.g., Slack) may operate in, or in conjunction with the workspace management system 108. As such, a user's indication of interest might be based at least in part on the occurrence and nature of events in the stream of application events 105.

The foregoing discussion of FIG. 3 discloses techniques by which seed objects can be formed and transmitted to a derivative predictor facility. One possible embodiment of a derivative predictor is now discussed.

Figure 4:
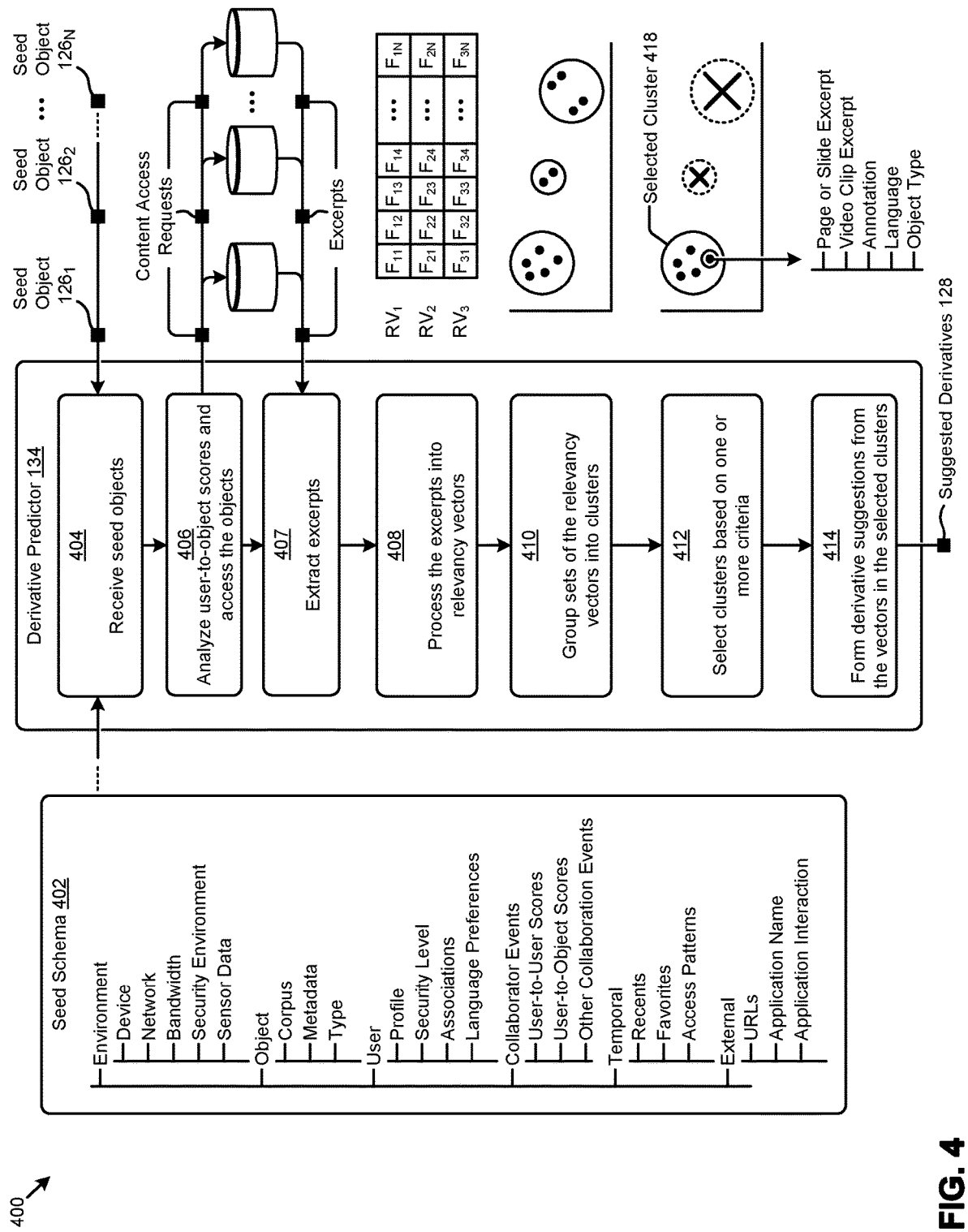
FIG. 4 illustrates a data processing flow in a prediction environment as used to produce suggested derivatives, according to an embodiment.

FIG. 4 illustrates a data processing flow in a prediction environment 400 as used to produce suggested derivatives. As an option, one or more variations of prediction environment 400 or any aspect thereof may be implemented in the context of the architecture and functionality of the embodiments described herein.

As shown, seed objects (e.g., seed object $126_1$, seed object $126_2$, . . . , seed object $126_N$) are received by derivative predictor 134 (step 404). As previously mentioned, a seed object can hold user-to-object scores. A particular user-to-object score of a seed object pertains to a respective content object. Accordingly, at step 406, the respective content object that corresponds to a sufficiently high user-to-object score is accessed and parsed to extract excerpts (step 407). Excerpts can be passages of text, or pages, or slides, or a frame or clip of a video, etc.). Many embodiments greedily extract excerpts from the content object, and rely on subsequent cluster processing to reduce the number of excerpts to a set of excerpts that form the set of suggested derivatives 128.

Any known clustering techniques can be used to group excerpts into clusters that share characteristics of relevancy. As shown, relevancy vectors (e.g., the shown relevancy vector $RV_1$, relevancy vector $RV_2$, and relevancy vector $RV_3$) can be formed (step 408) using any number of features (e.g., the depicted $F_{11}, F_{12}, F_{13}, F_{14}, \ldots, F_{1N}$). Clustering techniques group the relevancy vectors into clusters (step 410). Some of the clusters (e.g., based on size of the cluster) are selected (at step 412) using any one or more sets of selection criteria (e.g., size, entropy, etc.). The individual items represented in each selected cluster 418 can be mapped back to an excerpt from a content object. Depending on the type of content object (e.g., .ppt, movie, etc.) and corresponding excerpt (e.g., page, slide, clip, annotation, etc.), an applicable rendering of the excerpt is considered for returning to the caller (at step 414), such as in the form of suggested derivatives 128, as shown.

The seed objects correspond to a seed schema 402, as shown. More particularly, the seed schema comprises aspects of the user's environment, aspects of the content object, aspects of the user, aspects of collaborator events, aspects pertaining to temporal considerations such as recency of an event, aspects of historical access patterns, etc., and/or any aspects or characteristics of third party or external applications.

As shown, one output of the derivative predictor is a set of suggested derivatives 128. The set of suggested derivatives is returned to the caller. As depicted in the embodiment of FIG. 1C, the caller might be a data processing step (e.g., from step 116 and/or from step 118) of an inference processor. Such a case is shown and described as pertains to FIG. 5.

Figure 5:
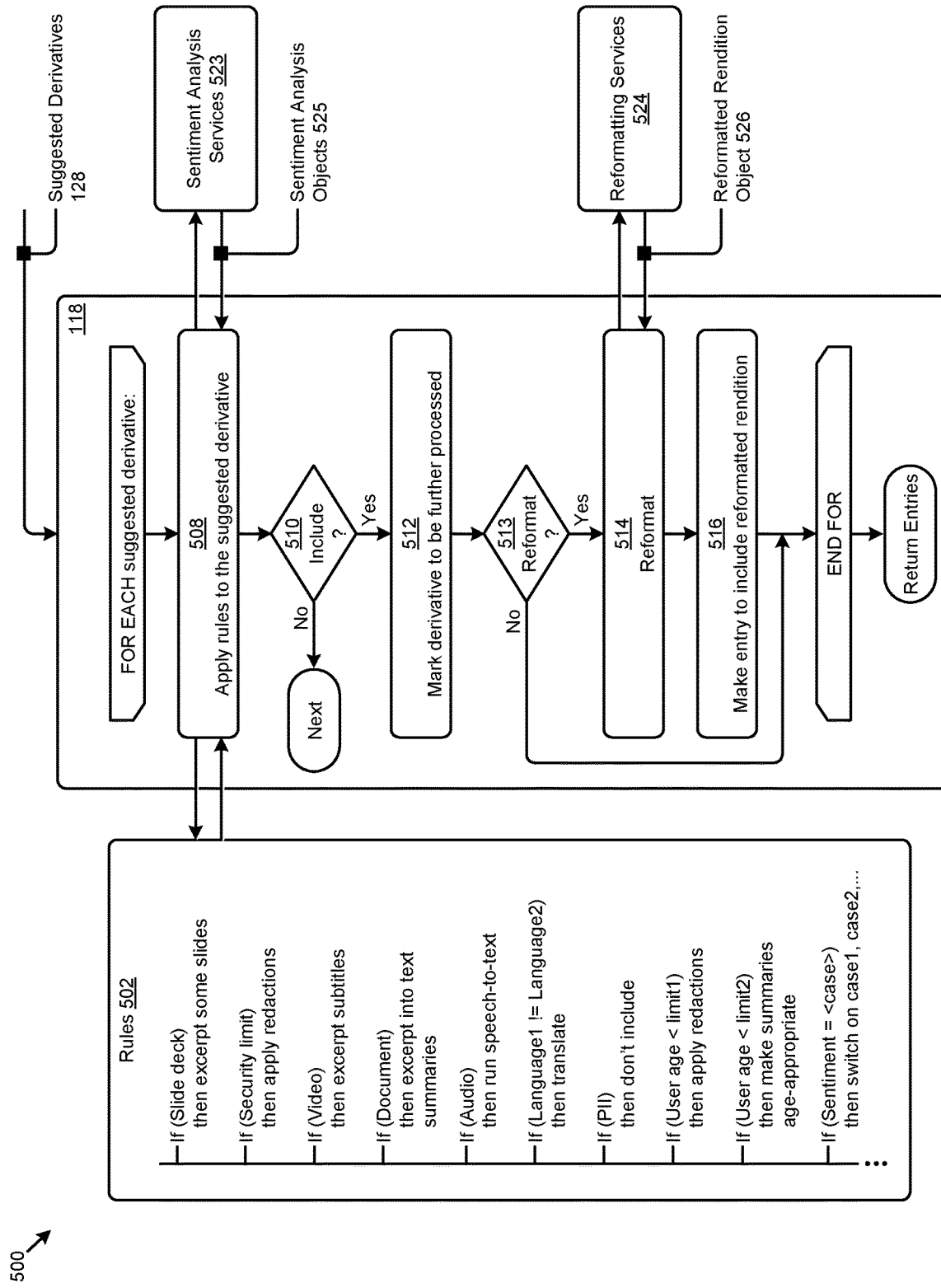
FIG. 5 illustrates data processing in a derivative analysis environment as used to produce formatted rendition objects, according to an embodiment.

FIG. 5 illustrates data processing in a derivative analysis environment 500 as used to produce formatted rendition objects. As an option, one or more variations of derivative analysis environment 500 or any aspect thereof may be implemented in the context of the architecture and functionality of the embodiments described herein.

As shown, step 118 executes a loop such that for each of the received suggested derivatives 128, a set of rules 502 are applied (step 508). The rules emit various flags and/or indications of actions to take over the particular suggested derivative. One such flag includes a Boolean flag that determines if the particular suggested derivative is to be included or not. A Boolean test is shown at decision 510. When the "Yes" branch of decision 510 is taken, then step 512 serves to mark the particular suggested derivative to be further processed. In some cases (see the "Yes" path of decision 513), a particular suggested derivative might need to be reformatted (e.g., to correspond to a user's computing environment). In such cases, one or more reformatting services 524 are employed (at step 514) to produce a reformatted rendition object 526. Step 516 serves to mark the particular suggested derivative to be further processed. When all suggested derivatives have been processed through the FOR EACH loop, the data processing flow ends, returning a set of suggested derivatives, some of which suggested derivatives might have been reformatted.

The aforementioned rules 502 can be formed as if-then-else statements or switch statements having a test for conditions, an action to take when the conditions are present or true, and another action to take when the conditions are not present or not true. Selected examples are shown in the set of rules 502. The condition portion of the rules might pertain to characteristics of a content object and/or characteristics of the user and/or characteristics of an environment or display device, etc. Strictly an example, if a subject document from which at least one suggested derivative had survived contains personally identifiable information, then all excerpts are excluded (e.g., at the "No" path of decision 510). As another example, if the sentiment of an excerpt is deemed to comport with a particular sentiment (e.g., "disgruntled", or "irate"), then one action might be taken, else another action is taken. Sentiment can be determined using sentiment analysis services 523. Such sentiment analysis services can be implemented as a native application, or as a native service, or as a third party service. Such sentiment analysis services can produce sentiment analysis objects 525, which are used when applying rules to a particular suggested derivative.

In yet another situation, conditions and actions that pertain to computer security (e.g., privileges and/or limitations, allow/deny scopes, etc.) can be defined in rules. Such a capability supports high fidelity and highly granular document-level security.

The document-level classification and corresponding security levels can be used during processing of derivatives. In one scenario, users will be permitted to view most relevant content that they are authorized to access. Access can be defined by a rule or rules, possibly in combination with a user's particular security clearance and/or a user's document access level. Access rules might also consider combinations of clearances and characteristics of the network in use and/or location from which users are accessing content objects. In some cases, a derivative can include only excerpts that are deemed to be accessible to a particular clearance level, even though other excerpts of a document might be identified as only accessible to users with a higher clearance level. Accordingly, the derivatives can be parsed out from content objects at granular level.

Any rule or rules can use external indicators such as device information, geo-location, etc. As such, systems that are implemented in accordance with the herein-disclosed techniques facilitate showing the most relevant set of content to the user.

The heretofore discussed data processing in a derivative analysis environment 500 supports various use cases where aspects pertaining to the age of the user is codified in rules. Consider a use case where the teacher assigns a book to students for reading. Data processing in derivative analysis is able to compare the deemed age of the user (e.g., collected via user information derived from the user's connected Facebook account) to a threshold. As one example implementation of use of a threshold to take or suppress an action based on a deemed age of the user, a rule can be defined to fire if the user is deemed to be under 18. Actions taken in that case (e.g., condition of user <limit of 18 years old), parse passages of the document and make redactions or use in-place replacements of inappropriate content before showing it to the young user, thus relieving the teacher and/or his or her school from liability.

Various other rule-based use models are supported. In some cases, one or more rules consider the user's attention span (e.g., based on observed past user behavior). A summary might be shortened or lengthened based on based on a particular user's observed behavior.

FIG. 6 depicts a web-based collaboration environment 600 that comprises a learning system that is used for forming collateral object representations. As an option, one or more variations of web-based collaboration environment 600 or any aspect thereof may be implemented in the context of the architecture and functionality of the embodiments described herein.

The embodiment shown in this FIG. 6 is merely one example. As shown, the learning system 602 is composed of several interoperating components; namely, a stimulus collector 604, a correlator 606, a learning model data storage area 608, a predictor 610, and a response collector 613. The foregoing components cooperate with an inference processor 122 in a manner that results in a set of instructions being sent to an action initiator 119. The action initiator takes actions on behalf of the user based on the learned behaviors of the user (e.g., over time, in possibly different settings). The learned behaviors (e.g., user behaviors or responses as a result of particular stimuli) can be fine-grained. A learning system predictor 610 can predict an action or set of actions that will be taken or are predicted to be taken by the user. The predictions can be statistically analyzed to as to include a confidence interval. In some cases, actions that are under consideration to be taken on behalf the user can be filtered based on a threshold. For example: (1) candidate actions that have a high confidence interval might be scheduled automatically, (2) candidate actions that have a lower but still relatively high confidence interval might be subjected to user confirmation through a user interface, and (3) candidate actions that have a low confidence interval might not be taken at all.

Figure 7:
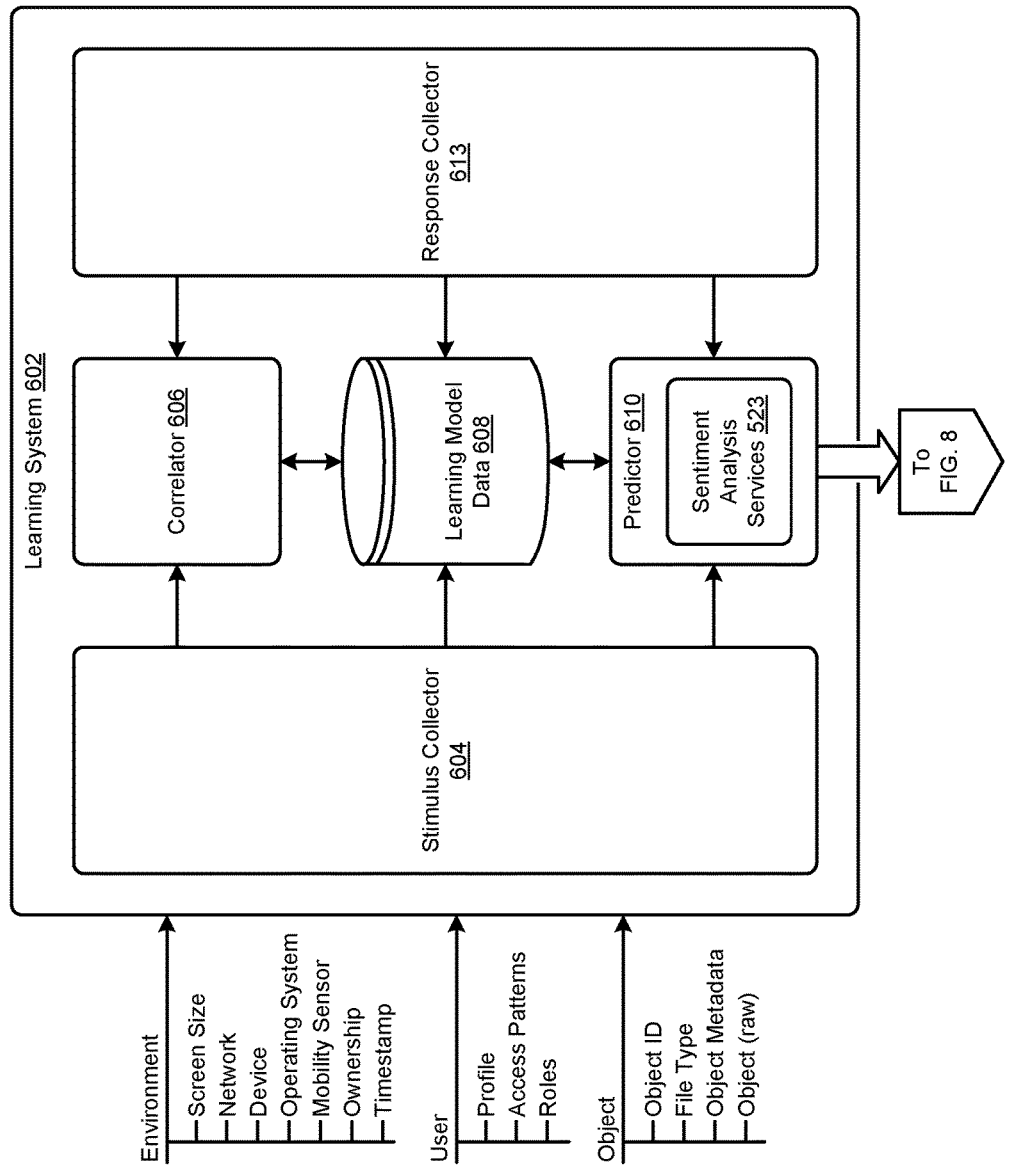
FIG. 7 depicts a learning system for correlating stimulus and response in a web-based collaboration environment, according to an embodiment.

The following FIG. 7 depicts a learning system that uses a predictor to formulate outputs (e.g., in the form of candidate actions) that are sent to an action initiator.

FIG. 7 depicts a learning system 700 for correlating stimulus and response in a web-based collaboration environment. As an option, one or more variations of learning system 700 or any aspect thereof may be implemented in the context of the architecture and functionality of the embodiments described herein. The learning system 700 or any aspect thereof may be implemented in any environment.

The stimulus collector 604 can receive stimulus in a wide variety of forms. Strictly as examples, the stimulus collector can receive measurable stimulus characteristics that pertain to the user's physical environment. Examples include the device type (e.g., laptop, phone, etc.) and/or screen size that the user is using. Other examples include further characteristics of the user's setting or environment such as (1) device operating system, (2) whether or not the user is on the move (e.g., indicating a mobile device), (3) ownership characteristics pertaining to the object and/or workspace, (4) timestamps of the requests, etc. Such collected environmental data can be combined with any other data available to the stimulus collection. Strictly as some such examples, aspects of the user/collaborator can be retrieved or derived from user profile data. Such user profile data can include a user role in an organization and/or a role as a reader/author/administrator of any of the aforementioned collaboration objects. Moreover, the collaboration object itself might include inherent characteristics and/or metadata that describes the collaboration object, its ID, its type, etc. A collaboration object often has associated metadata that includes a wide range of metadata pertaining to the object, characteristics of the object in its raw form, access patterns observed over the collaboration object or similar collaboration objects, etc.

Some learning system embodiments make predictions based on tagged stimulus/response records. Many user interaction scenarios are supported by such learning system embodiments. As a sample interaction scenario, consider a customer support hotline (e.g., chat hotline). The stimulus collector 604 can sniff support requests from customers. The response collector 613 can sniff corresponding customer support communications, and the correlator 606 can form correlations between requests and "known-good" responses.

A predictor 610 can be used as a recommendation system that automatically produces recommended communications back to the customer based on their question and sentiment. As shown, predictor 610 includes one or more modules or facilities pertaining to sentiment analysis services 523. Based on the sentiment, the predictor 610 can be used to select a message for delivery to the user or to a human support staff. Such automation can be integrated with third party applications.

In one specific example, consider a scenario where a user contacts a first web service provider through a computer-aided help desk with the question, "How does the Notifications API work?" This question is sent to an installation of the learning system 602 that hosts learning model data 608, which learning model data comprises trained data (e.g., data comprising known-good stimulus and response correlations). The predictor 610 accesses the learning model data and generates a response based on any and all aspects that are known about the customer that asked the question (e.g., the requestor's user information, the question posed, the sentiment, etc.).

The stimulus collector can continuously collect new information. If this user asks another question such as, "I got the API to work. How is it priced?" then given that the learning model data 608 has been prepopulated with known-good stimulus and response correlations, and because the learning model data 608 already has the user's past history, the predictor 610 is able to associate which API the user is talking about. A template-based response for the user (e.g., using the user's name as a variable value) can be sent back to the user to answer the question. In some cases, the predictor influences a response based on the results of a sentiment analysis service. Using such a service, the "mood" of an incoming question can be considered by the predictor in formulating or influencing formulation of a response back to the user. For example, if the service indicates that the user is irate, instead of responding back with a pre-canned reply such as, "Someone from our technical support staff will be in touch with you shortly", instead, an action initiator might take steps to have a human intervene.

The foregoing is merely one example involving a small set of observations. In this and other use cases, any combination of event observations and/or event attributes and/or characteristics of the environment, user, object etc. can be used individually or in combination when assessing user intent for an object and determining actions to take. In some cases, and as shown and described in FIG. 8, an action initiator can use prediction combinations with a rulebase and then-current conditions so as to generate and schedule a set of actions to be taken on behalf of the user.

Figure 8:
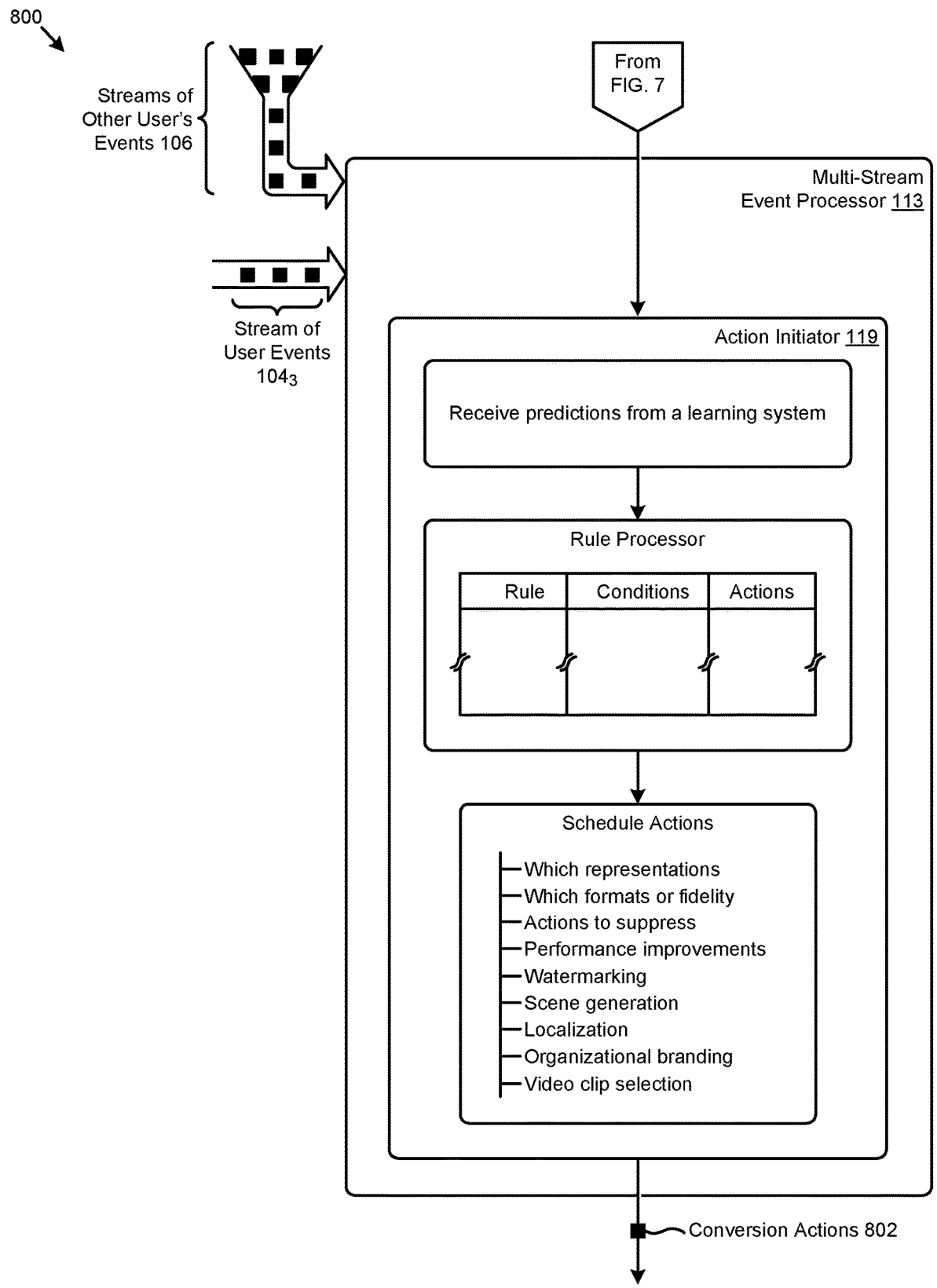
FIG. 8 depicts an action initiator flow for determining and scheduling object conversion tasks after inferring or predicting user demand for collateral object representations, according to an embodiment.

FIG. 8 depicts an action initiator flow 800 for determining and scheduling object conversion tasks after inferring or predicting user demand for collateral object representations. As an option, one or more variations of action initiator flow 800 or any aspect thereof may be implemented in the context of the architecture and functionality of the embodiments described herein. The action initiator flow 800 or any aspect thereof may be implemented in any environment.

The embodiment shown in FIG. 8 is merely one example. As shown, the action initiator 119 is a component within a multi-stream event processor 113. In some partitioning embodiments, a multi-stream event processor 113 receives a stream of user events $104_3$ as well as streams of other user's events 106. Additionally, and as shown, the action initiator receives predictions (e.g., candidate actions) from a learning system (see FIG. 7). The predictions are further processed by a rule processor that applies rules to predictions. A rulebase can include a set of rules, any of which is associated with a respective set of conditions to collect and/or evaluate the rules. Combinations of a prediction with determined applicability of one or more rules to the prediction, and a set of then-current conditions, serve to resolve to actions to be taken on behalf of the user.

As shown, actions of the rulebase might result in determination of which representations to generate, which formats of fidelity are predicted to be needed by the user, which actions to suppress (e.g., if a confidence interval value is low, or if there are other heuristics that suppress an action), actions to be taken to improve performance (e.g., pre-generation to caching, etc.), actions to be taken pertaining to watermarking representations, actions to be taken pertaining to speech-oriented representations (e.g., text to speech), actions to be taken pertaining to character recognition (OCR) representations, actions to be taken to scene generation (e.g., from 3D models), actions to be taken to perform localization and/or branding, etc. Such actions, together with respective applicable degrees of specificity to be used by any one or more conversion services are emitted by the action initiator as conversion actions 802.

The foregoing examples are merely a small set of illustrative examples. Additional examples are found in the following tables.

TABLE 1

Example preferences and settings

| Ref | Information |
|---|---|
| 1 | Level of sensitivity/confidentiality and access type |
| 2 | General environmental preference of the user |
| 3 | Device-specific preference of the user (e.g., to adjust fidelity and type of output based on the device, its environment inferred intent) |

TABLE 2

Example learning system functions

| Ref | Learning System Engine Operations |
|---|---|
| 1 | Get input file(s) |
| 2 | Identify input file type |
| 3 | Determine most appropriate output rendition type based on learned behaviors |
| 4 | Propose candidate outputs (e.g., different file types) |
| 5 | Suppress output types no longer needed to be provided to the user |

TABLE 3

Example environment information

| Ref | Information |
|---|---|
| 1 | Client information (e.g., user profile) |
| 2 | Screen size |
| 3 | Network bandwidth profile |
| 4 | Device type, version or browser type, version, etc. |
| 5 | Mobility sensors, GPS, accelerometers, etc. |
| 6 | Ownership information of the device (e.g., phone number, carrier, etc.) |
| 7 | Historical access patterns over certain types of documents |

TABLE 4

Example user history inquiries

| Ref | Information |
|---|---|
| 1 | Has this user seen the file before? |
| 2 | What is the user's role or sponsoring organization's type/industry? |
| 3 | Did the user provide explicit instructions (e.g., in shared message to collaborators)? |
| 4 | What did the user do just before accessing this file? |
| 5 | What are other people doing with the same file? |
| 6 | What parts of the documents have they read? |

TABLE 5

Example observations

| Ref | Information |
|---|---|
| 1 | Observations of user's further dissemination of the collaboration object and/or generated representations |
| 2 | Observations collaborator's consumption patterns over time |
| 3 | Analysis of explicit feedback based on one or more user's interaction with generated representations |

TABLE 6

Example user profile information

| Ref | Information |
|---|---|
| 1 | Role/industry |
| 2 | Sponsoring organization |
| 3 | Groups that the user belongs to |

TABLE 7

Example personalizations

| Ref | Type of Personalization |
|---|---|
| 1 | Personalization based on the type or unit of content |
| 2 | Personalization based on the file extension |
| 3 | Personalization based on the fidelity to be delivered in the representations |
| 4 | Personalization based on a pointer to the user's last access point of the file |
| 5 | Personalization depending on the network bandwidth (e.g., how much to stream, what fidelity) |
| 6 | Personalization based access grants to specific features (whether to allow print screen, print, download, search, annotation, e-signatures, etc.) |
| 7 | Personalization pertaining to watermarking |
| 8 | Personalization (e.g., preferences) that pertain to the content that is the best representation of what the entire file contains |
| 9 | Personalization based on preferences pertaining to 360 degree photos: angle, scene, background (what is the most appropriate angle, background, scene to show the file, 3D aspects or settings, etc.) |
| 10 | File/content type-specific considerations |
| 11 | Preferences to pre-create static renditions and pre-cache the pre-created renditions |

Characteristics of an object can include other personalizations beyond those heretofore described. For example, a set of permissions might pertain to forwarding permissions, searching ability, annotation ability, presence of and/or possibilities for e-signatures, etc. In some cases, characteristics of an object or annotation can include characteristics that pertain to the content. Strictly as examples, such characteristics that pertain to the content can include availability of 360-degree and/or three-dimensional photo renditions or panoramic renditions; availability of angle, scene or background metadata; and/or manipulability of the foregoing, language of an annotation, and/or any sort of metadata that is applicable to the object or annotation. Still further examples are provided hereunder.

Personalization and/or localization and/or other types of conversions can be accomplished with natively-provided conversions (e.g., to/from standard and/or proprietary file or object types), possibly in conjunction with plug-in modules (e.g., for hand writing recognition, speech detection, speech-to-text conversion, binary file "cracking", binary file parsing, unit-to-unit conversions, etc.). In some cases, automation (e.g., for personalization and/or localization) is provided in the form of microservices that can be invoked by any processing entity. Such microservices can vary in capability. Strictly as examples, microservices can be implemented as a component in a multi-functioned application that is integrated into the cloud-based service platform, or microservices can be isolated for access via a set of application programming interface (API) calls that provide interfaces to individual microservices that in turn interface with the cloud-based service platform to perform a particular set of tasks.

Strictly as additional examples, the workspace management system might observe that a user has a pattern of accessing a video file, then requesting that a microservice transcode the video file to a lower resolution. The user stimulus (e.g., the user accessing a video file) and the user's response (e.g., the user's explicit request for a transcoding operation) can be detected, saved into learning model data, and upon additional occurrences, the pattern will emerge. When the pattern of user responses can be predicted given the user stimulus, then actions can be taken on behalf of the user.

In an example case, video clips can be selected for use in news feed based on excerpts of video that other similar users have watched, annotated, etc. The weighting of an excerpt that other similar users have watched, annotated can be tuned with respect to the weighting of the user's own explicitly stated interests (e.g., search terms) and tuned with respect to observed expertise or interest areas derived from third-party systems.

As yet another example, the workspace management system might observe that a user has a pattern of accessing files with a ".ppt" file extension, then requesting that a microservice add a particular watermark to the file. The observed user stimulus (e.g., the user accessing .ppt file) and the observed user response (e.g., the user's explicit request for a watermarking operation) can be detected, saved into learning model data, and upon additional occurrences, the pattern will emerge, to the extent that the pattern of user responses can be predicted given the user stimulus. For still future occurrences of the stimulus (e.g., the user accessing .ppt file), the inference processor can predict that the user would, at least to a determined likelihood, request a corresponding watermarking operation. The inference processor can then schedule the watermarking operation to be performed on behalf of the user—without the user having to explicitly request the watermarking operation.

Any of the foregoing embodiments can be implemented in computing systems, examples of which are presented as pertaining to the following system architectures.

Additional Embodiments of the Disclosure

Additional Practical Application Examples

Figure 9:
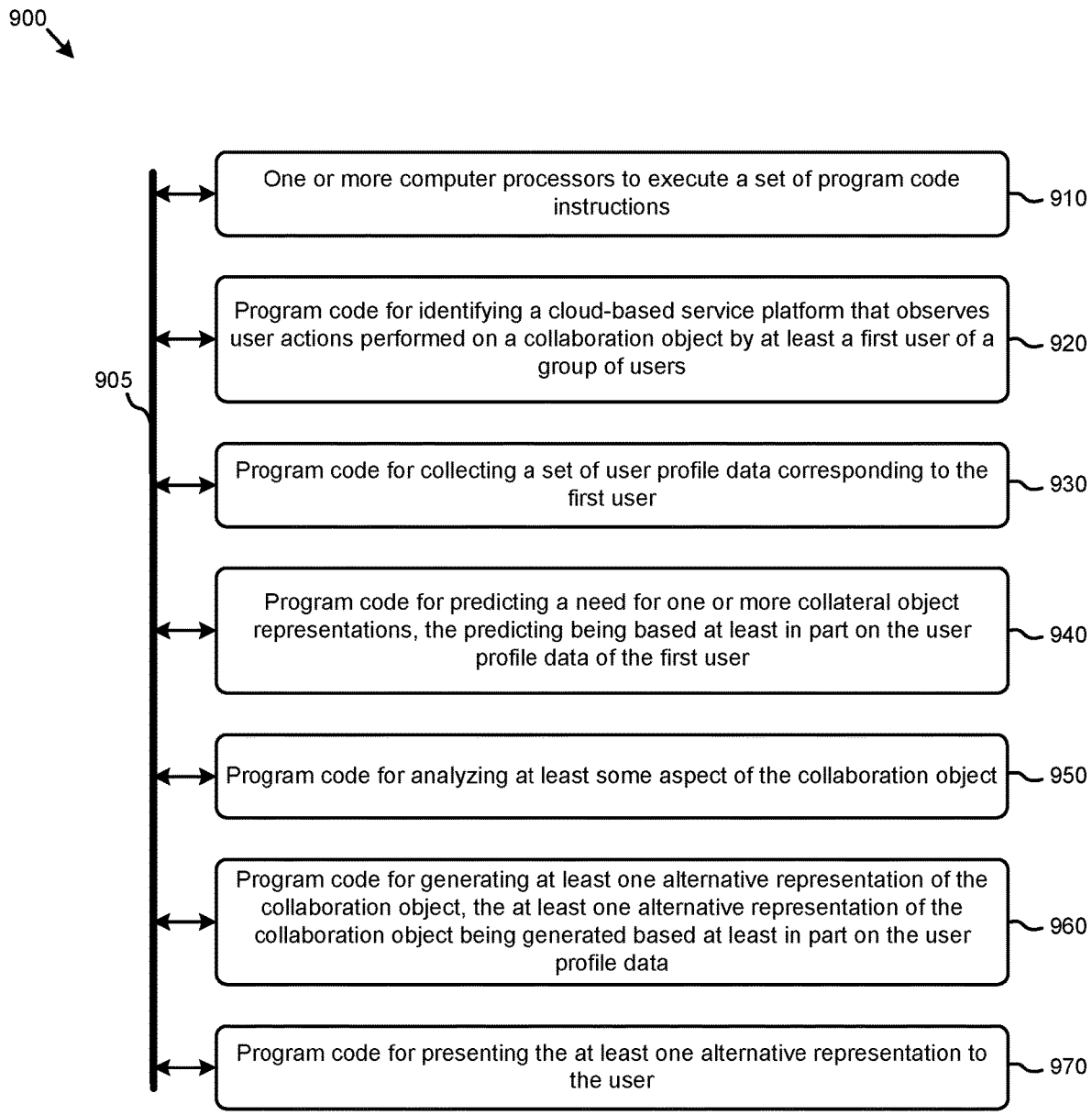
FIG. 9 depicts system components as arrangements of computing modules that are interconnected so as to implement certain of the herein-disclosed embodiments.

FIG. 9 depicts a system 900 as an arrangement of computing modules that are interconnected so as to operate cooperatively to implement certain of the herein-disclosed embodiments. This and other embodiments present particular arrangements of elements that, individually and/or as combined, serve to form improved technological processes that address how to determine a set of actions to be taken on behalf of the user to generate collateral representations of collaboration objects. The partitioning of system 900 is merely illustrative and other partitions are possible. As an option, the system 900 may be implemented in the context of the architecture and functionality of the embodiments described herein. Of course, however, the system 900 or any operation therein may be carried out in any desired environment.

The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims.

The shown embodiment implements a portion of a computer system, presented as system 900, comprising one or more computer processors to execute a set of program code instructions (module 910) and modules for accessing memory to hold program code instructions to perform: identifying a cloud-based service platform that observes user actions performed on a collaboration object by at least a first user of a group of users (module 920); collecting a set of user profile data corresponding to the first user (module 930); predicting a need for one or more collateral object representations, the predicting being based at least in part on the user profile data of the first user (module 940); analyzing at least some aspect of the collaboration object (module 950); generating at least one alternative representation of the collaboration object, the at least one alternative representation of the collaboration object being generated based at least in part on the user profile data (module 960); and presenting the at least one alternative representation to the user (module 970).

Variations of the foregoing may include more or fewer of the shown modules. Certain variations may perform more or fewer (or different) steps, and/or certain variations may use data elements in more, or in fewer (or different) operations.

Some embodiments include variations that further comprise analyzing contents of the collaboration object to identify at least one particular item of shared content.

Some embodiments include variations where the alternative representation of the collaboration object is generated based at least in part on at least one of, a document sensitivity, a document confidentiality, an environmental preference, or a device-specific preference.

Some embodiments include variations where the alternative representation of the collaboration object is generated based at least in part on at least one of, a screen size, a network bandwidth profile, a device type, a browser type, a browser version, or a mobility sensor.

Some embodiments include variations where the predicting is performed based at least in part on at least one of, an access pattern, a set of observed user stimulus, or pattern of user responses.

Some embodiments include variations where the predicting is performed based at least in part on at least one of, user access type, or a user request for a watermarking operation.

Some embodiments include variations where the predicting is based at least in part on at least one of, one or more access grants to specific features.

Some embodiments include variations where at least one of the one or more access grants allows a print screen operation, or a download operation, or a search operation, or an annotation operation.

Some embodiments include variations where the user actions taken on the collaboration object comprise at least one of, user interactions at a workspace, or user interactions with conversion services, or user interactions with an application.

Some embodiments include variations where the user actions taken on the collaboration object comprise at least one of, user actions taken at an application that is integrated into the cloud-based service platform, or use of a set of application programming interface calls to one or more microservices.

System Architecture Overview

Additional System Architecture Examples

Figure 10A:
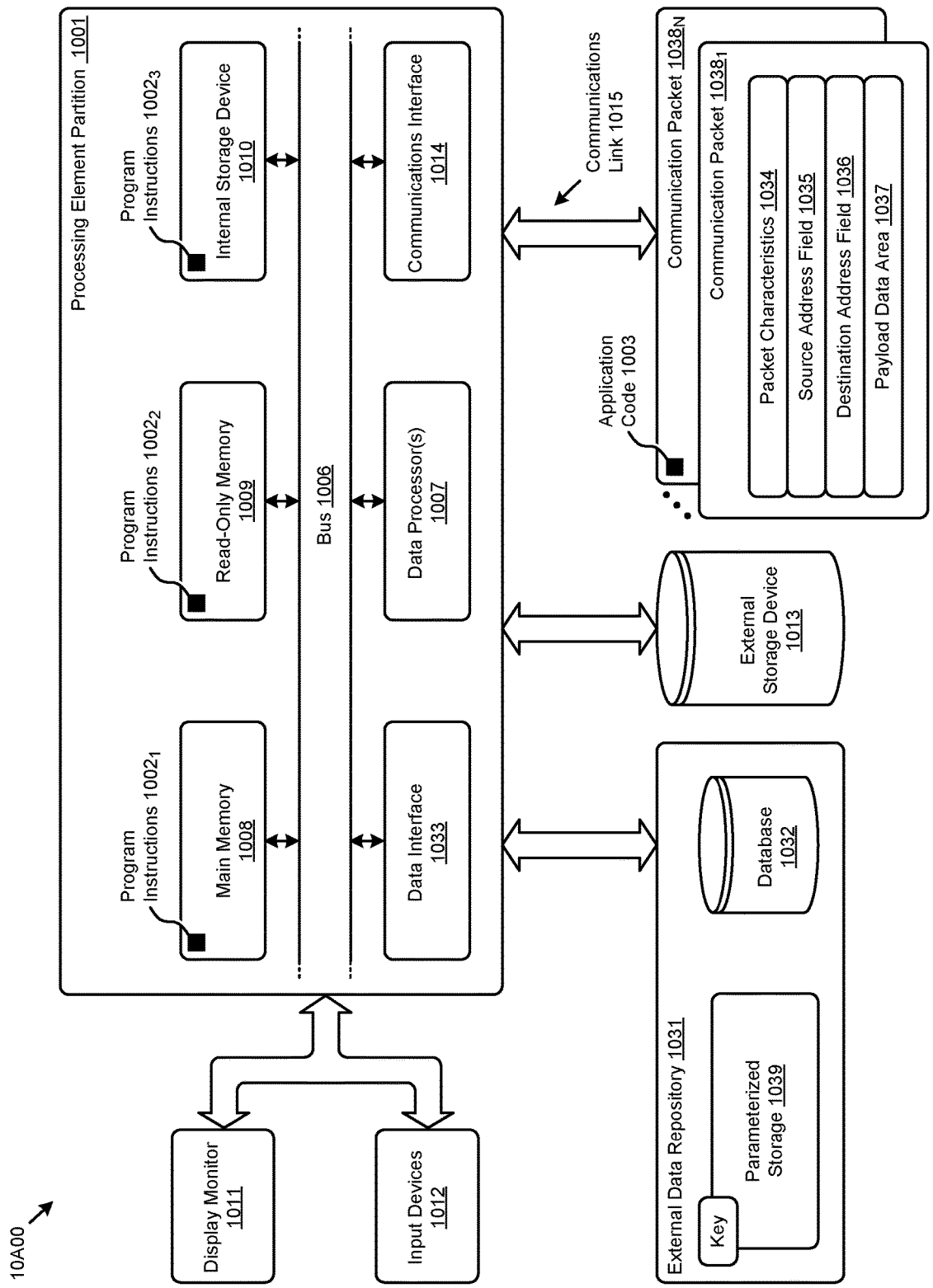
FIG. 10A and FIG. 10B present block diagrams of computer system architectures having components suitable for implementing embodiments of the present disclosure, and/or for use in the herein-described environments.

FIG. 10A depicts a block diagram of an instance of a computer system 10A00 suitable for implementing embodiments of the present disclosure. Computer system 10A00 includes a bus 1006 or other communication mechanism for communicating information. The bus interconnects subsystems and devices such as a central processing unit (CPU), or a multi-core CPU (e.g., data processor 1007), a system memory (e.g., main memory 1008, or an area of random access memory (RAM)), a non-volatile storage device or non-volatile storage area (e.g., read-only memory 1009), an internal storage device 1010 or external storage device 1013 (e.g., magnetic or optical), a data interface 1033, a communications interface 1014 (e.g., PHY, MAC, Ethernet interface, modem, etc.). The aforementioned components are shown within processing element partition 1001, however other partitions are possible. Computer system 10A00 further comprises a display 1011 (e.g., CRT or LCD), various input devices 1012 (e.g., keyboard, cursor control), and an external data repository 1031.

According to an embodiment of the disclosure, computer system 10A00 performs specific operations by data processor 1007 executing one or more sequences of one or more program code instructions contained in a memory. Such instructions (e.g., program instructions $1002_1$, program instructions $1002_2$, program instructions $1002_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 10A00 performs specific networking operations using one or more instances of communications interface 1014. Instances of communications interface 1014 may comprise one or more networking ports that are configurable (e.g., pertaining to speed, protocol, physical layer characteristics, media access characteristics, etc.) and any particular instance of communications interface 1014 or port thereto can be configured differently from any other particular instance. Portions of a communication protocol can be carried out in whole or in part by any instance of communications interface 1014, and data (e.g., packets, data structures, bit fields, etc.) can be positioned in storage locations within communications interface 1014, or within system memory, and such data can be accessed (e.g., using random access addressing, or using direct memory access DMA, etc.) by devices such as data processor 1007.

Communications link 1015 can be configured to transmit (e.g., send, receive, signal, etc.) any types of communications packets (e.g., communication packet $1038_1$, communication packet $1038_N$) comprising any organization of data items. The data items can comprise a payload data area 1037, a destination address 1036 (e.g., a destination IP address), a source address 1035 (e.g., a source IP address), and can include various encodings or formatting of bit fields to populate packet characteristics 1034. In some cases, the packet characteristics include a version identifier, a packet or payload length, a traffic class, a flow label, etc. In some cases, payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1007 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1031, which in turn can be formatted into any one or more storage areas, and which can comprise parameterized storage 1039 accessible by a key (e.g., filename, table name, block address, offset address, etc.).

Execution of the sequences of instructions to practice certain embodiments of the disclosure are performed by a single instance of a computer system 10A00. According to certain embodiments of the disclosure, two or more instances of computer system 10A00 coupled by a communications link 1015 (e.g., LAN, public switched telephone network, or wireless network) may perform the sequence of instructions required to practice embodiments of the disclosure using two or more instances of components of computer system 10A00.

Computer system 10A00 may transmit and receive messages such as data and/or instructions organized into a data structure (e.g., communications packets). The data structure can include program instructions (e.g., application code 1003), communicated through communications link 1015 and communications interface 1014. Received program code may be executed by data processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key).

Processing element partition 1001 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1007. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to generation of collateral object representations in collaboration environments. A module may include one or more state machines and/or combinational logic used to implement or facilitate the operational and/or performance characteristics pertaining to generation of collateral object representations in a web-based collaboration environment.

Various implementations of database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of generation of collateral object representations in a collaboration environment). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to generation of collateral object representations in a collaboration environment, and/or for improving the way data is manipulated when performing computerized operations pertaining to systems that infer user intent and predict a user's need for collateral object representations.

Figure 10B:
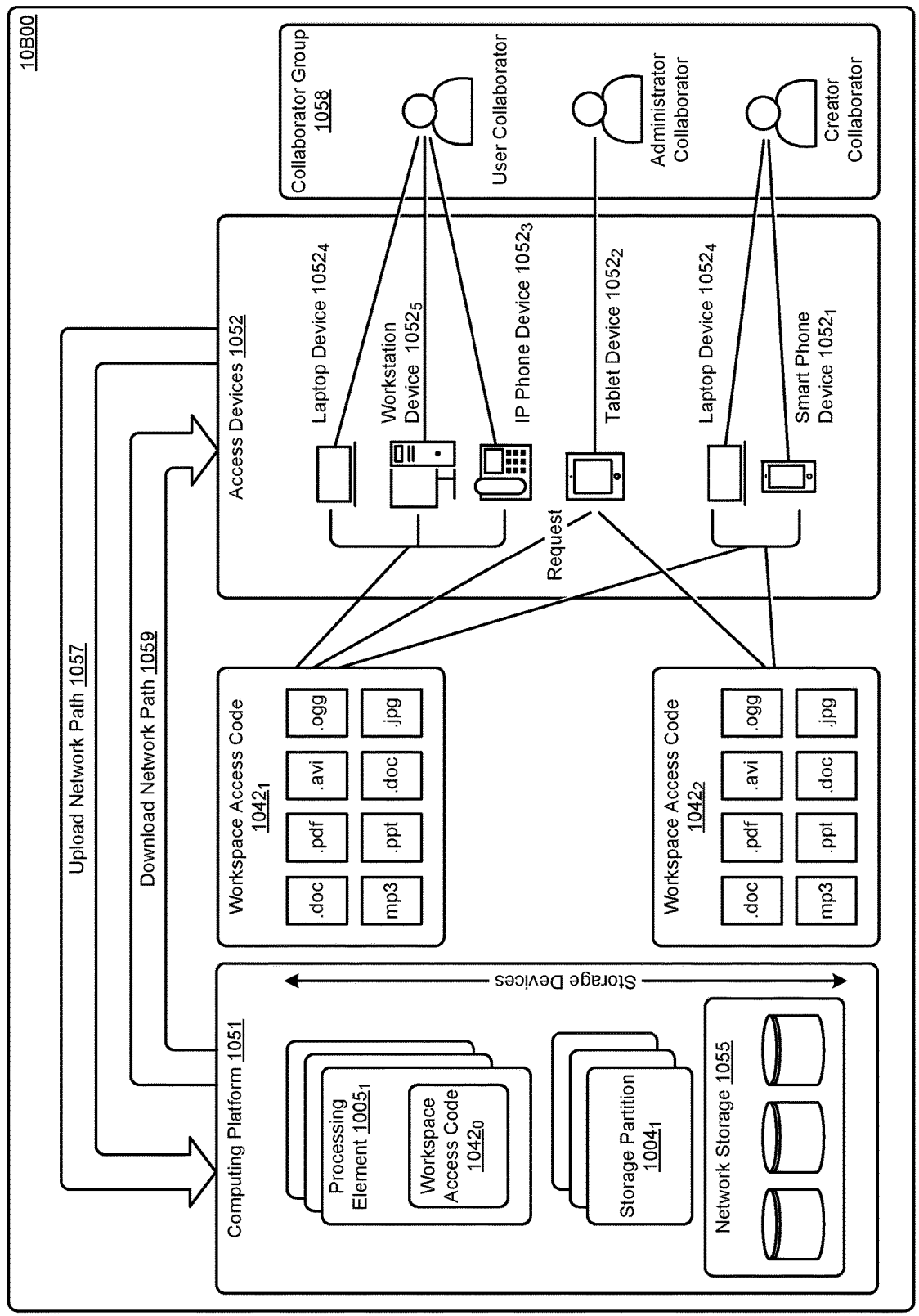

FIG. 10B depicts a block diagram of an instance of a cloud-based environment 10B00. Such a cloud-based environment supports access to workspaces through the execution of workspace access code (e.g., workspace access code $1042_0$, workspace access code $1042_1$, and workspace access code $1042_2$). Workspace access code can be executed on any of access devices 1052 (e.g., laptop device $1052_4$, workstation device $1052_5$, IP phone device $1052_3$, tablet device $1052_2$, smart phone device $1052_1$, etc.). A group of users can form a collaborator group 1058, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1051, including in a middleware setting. As shown, a portion of the workspace access code resides in and can be executed on one or more processing elements (e.g., processing element $1005_1$). The workspace access code can interface with storage devices such as networked storage 1055. Storage of workspaces and/or any constituent files or objects, and/or any other code or scripts or data can be stored in any one or more storage partitions (e.g., storage partition $1004_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 1057). A stored workspace can be delivered to a particular user and/or shared with other particular users via a download (e.g., a download from a processing element to an access device over a download network path 1059).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:
1. A method comprising:
   identifying a cloud-based service platform that observes user actions performed on a collaboration object by one or more users;
   predicting a collateral object representation of the collaboration object, wherein a prediction of the collateral object representation is generated by:
      collecting user environment data and a pattern of user actions, the user environment data comprising user device information to generate the collateral object representation in a particular format for the user;
      inferring a user interest corresponding to the collaboration object based on at least the pattern of user actions;
      generating suggested derivative objects at least by analyzing the collaboration object based on at least information about a candidate collaboration object and information about user behavior over the col- laboration object, the suggested derivative objects being predicted to be relevant;

analyzing the suggested derivative objects to determine which of the suggested derivative objects to include in the collateral object, wherein the suggested derivative objects to be included comprises a number of suggested derivative objects that is less then the total number of derivative objects generated by analyzing the collaboration object; and generating an amalgamation instruction that identifies the suggested derivative objects determined to be included in the collateral object;

generating the predicted collateral object representation, wherein the collateral object is generated by executing the amalgamation instruction to combine the suggested derivative objects determined to be included in the collateral object;

presenting the collateral object to the user.

2. The method of claim 1, wherein the representation is generated based at least in part on at least one of a document sensitivity, a document confidentiality, an environmental preference, or a device-specific preference.

3. The method of claim 1, wherein the representation is generated based at least in part on at least one of a screen size, a network bandwidth profile, a device type, a browser type, a browser version, or a mobility sensor.

4. The method of claim 1, wherein the prediction of the collateral object representation is based at least in part on at least one of a set of observed user stimulus or a pattern of user responses.

5. The method of claim 4, wherein the prediction of the collateral object representation is based least in part on at least one of a user access type, or a user request for a watermarking operation.

6. The method of claim 1, wherein the prediction of the collateral object representation is based at least in part on one or more access grants.

7. The method of claim 6, wherein at least one of the one or more access grants allows a print screen operation, or a download operation, or a search operation, or an annotation operation.

8. The method of claim 1, wherein the user actions taken on the collaboration object comprise at least one of user interactions at a workspace, or user interactions with conversion services, or user interactions with an application.

9. The method of claim 1, wherein the user actions taken on the collaboration object comprise at least one of user actions taken at an application that is integrated into the cloud-based service platform, or use of a set of application programming interface calls to one or more microservices.

10. The method of claim 1, wherein predicting the collateral object representation corresponds to predicting forms or renditions of collaboration objects found in the cloud-based service platform.

11. The method of claim 10, wherein the forms or renditions comprise of at least one collaboration object.

12. The method of claim 1, wherein the collateral object representation further comprises a thumbnail.

13. A computer readable medium, embodied in a non-transitory computer readable medium, the non-transitory computer readable medium having stored thereon a sequence of instructions which, when stored in memory and executed by one or more processors, causes the one or more processors to perform a set of acts, the set of acts comprising:

identifying a cloud-based service platform that observes user actions performed on a collaboration object by one or more users;

predicting a collateral object representation of the collaboration object, wherein a prediction of the collateral object representation is generated by:

collecting user environment data and a pattern of user actions, the user environment data comprising user device information to generate the collateral object representation in a particular format for the user;

inferring a user interest corresponding to the collaboration object based on at least the pattern of user actions;

generating suggested derivative objects at least by analyzing the collaboration object based on at least information about a candidate collaboration object and information about user behavior over the collaboration object, the suggested derivative objects being predicted to be relevant;

analyzing the suggested derivative objects to determine which of the suggested derivative objects to include in the collateral object, wherein the suggested derivative objects to be included comprises a number of suggested derivative objects that is less then the total number of derivative objects generated by analyzing the collaboration object; and generating an amalgamation instruction that identifies the suggested derivative objects determined to be included in the collateral object;

generating the predicted collateral object representation, wherein the collateral object is generated by executing the amalgamation instruction to combine the suggested derivative objects determined to be included in the collateral object; and presenting the collateral object to the user.

14. The computer readable medium of claim 13, wherein the representation is generated based at least in part on at least one of a document sensitivity, a document confidentiality, an environmental preference, or a device-specific preference.

15. The computer readable medium of claim 13, wherein the representation is generated based at least in part on at least one of a screen size, a network bandwidth profile, a device type, a browser type, a browser version, or a mobility sensor.

16. The computer readable medium of claim 13, wherein the prediction of the collateral object representation is based at least in part on at least one of a set of observed user stimulus or a pattern of user responses.

17. The computer readable medium of claim 16, wherein the prediction of the collateral object representation is based least in part on at least one of a user access type, or a user request for a watermarking operation.

18. The computer readable medium of claim 13, wherein the prediction of the collateral object representation is based at least in part on one or more access grants.

19. A system comprising:

a non-transitory storage medium having stored thereon a sequence of instructions; and one or more processors that execute the sequence of instructions to cause the one or more processors to perform a set of acts, the set of acts comprising, identifying a cloud-based service platform that observes user actions performed on a collaboration object by one or more users;

predicting a collateral object representation of the collaboration object, wherein a prediction of the collateral object representation is generated by:
  collecting user environment data and a pattern of user actions, the user environment data comprising user device information to generate the collateral object representation in a particular format for the user;
  inferring a user interest corresponding to the collaboration object based on at least the pattern of user actions;
  generating suggested derivative objects at least by analyzing the collaboration object based on at least information about a candidate collaboration object and information about user behavior over the collaboration object, the suggested derivative objects being predicted to be relevant;
  analyzing the suggested derivative objects to determine which of the suggested derivative objects to include in the collateral object, wherein the suggested derivative objects to be included comprises a number of suggested derivative objects that is less then the total number of derivative objects generated by analyzing the collaboration object; and
  generating an amalgamation instruction that identifies the suggested derivative objects determined to be included in the collateral object;
  generating the predicted collateral object representation, wherein the collateral object is generated by executing the amalgamation instruction to combine the suggested derivative objects determined to be included in the collateral object; and
  presenting the collateral object to the user.

20. The system of claim 19, wherein the representation is generated based at least in part on at least one of a document sensitivity, a document confidentiality, an environmental preference, or a device-specific preference.

* * * * *